(12) United States Patent
Yoshihara

(10) Patent No.: US 7,466,304 B2
(45) Date of Patent: Dec. 16, 2008

(54) IMAGE PROCESSING APPARATUS, STORAGE MEDIUM HAVING IMAGE PROCESSING PROGRAM STORED THEREON, GAME APPARATUS AND STORAGE MEDIUM HAVING GAME PROGRAM STORED THEREON

(75) Inventor: Kazuki Yoshihara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 405 days.

(21) Appl. No.: 11/445,191

(22) Filed: Jun. 2, 2006

(65) Prior Publication Data
US 2007/0075967 A1    Apr. 5, 2007

(30) Foreign Application Priority Data
Oct. 4, 2005    (JP) .............................. 2005-291638

(51) Int. Cl.
G09G 5/02    (2006.01)
G09G 5/00    (2006.01)
G06K 9/36    (2006.01)
A63F 13/00    (2006.01)
A63F 9/24    (2006.01)
G01C 21/30    (2006.01)

(52) U.S. Cl. .................. 345/157; 345/649; 345/659; 345/643; 345/556; 715/700; 715/857; 382/293; 382/296; 463/37

(58) Field of Classification Search ................. 345/619, 345/649–654, 657, 659, 156–163, 168, 643, 345/556, 552; 463/31, 36–37; 382/293–299; 715/700, 733, 855–860; 348/14.03, 14.04, 348/583, 734
See application file for complete search history.

(56) References Cited

FOREIGN PATENT DOCUMENTS

JP    05-100809    4/1993
JP    09-134269    5/1997

*Primary Examiner*—Wesner Sajous
(74) *Attorney, Agent, or Firm*—Nixon & Vanderhye P.C.

(57) ABSTRACT

For operating an operation target object displayed on a screen using a pointing device, a first input coordinate value indicating a position on the screen designated by the pointing device and a second input coordinate value detected discretely from, and before, the first input coordinate value are detected. A changing direction is calculated based on the first input coordinate value and the second input coordinate value, and a rotation direction is determined based on the changing direction. The operation target object is rotated in the rotation direction.

11 Claims, 16 Drawing Sheets

FIG. 9

| 0 | 14 | 0 | 0 | 0 | 0 | 0 | 0 | 17 | 17 | 17 |
|---|---|---|---|---|---|---|---|---|---|---|
| 0 | 14 | 0 | 0 | 0 | 0 | 16 | 16 | 17 | 0 | 0 |
| 14 | 14 | 0 | 0 | 0 | 16 | 16 | 15 | 15 | 0 | 0 |
| 0 | 11 | 0 | 0 | 0 | 0 | 0 | 15 | 15 | 0 | 0 |
| 11 | 11 | 11 | 0 | 12 | 12 | 12 | 12 | 0 | 13 | 0 |
| 0 | 0 | 8 | 0 | 0 | 0 | 0 | 13 | 13 | 13 | 10 |
| 0 | 0 | 8 | 8 | 0 | 9 | 9 | 9 | 0 | 10 | 10 |
| 0 | 0 | 0 | 8 | 0 | 6 | 6 | 9 | 0 | 10 | 0 |
| 5 | 5 | 5 | 5 | 0 | 6 | 6 | 0 | 0 | 7 | 0 |
| 1 | 0 | 0 | 0 | 0 | 0 | 3 | 0 | 0 | 7 | 7 |
| 1 | 1 | 0 | 0 | 2 | 3 | 3 | 0 | 0 | 7 | 0 |
| 1 | 0 | 2 | 2 | 2 | 3 | 0 | 4 | 4 | 4 | 4 |

17

17

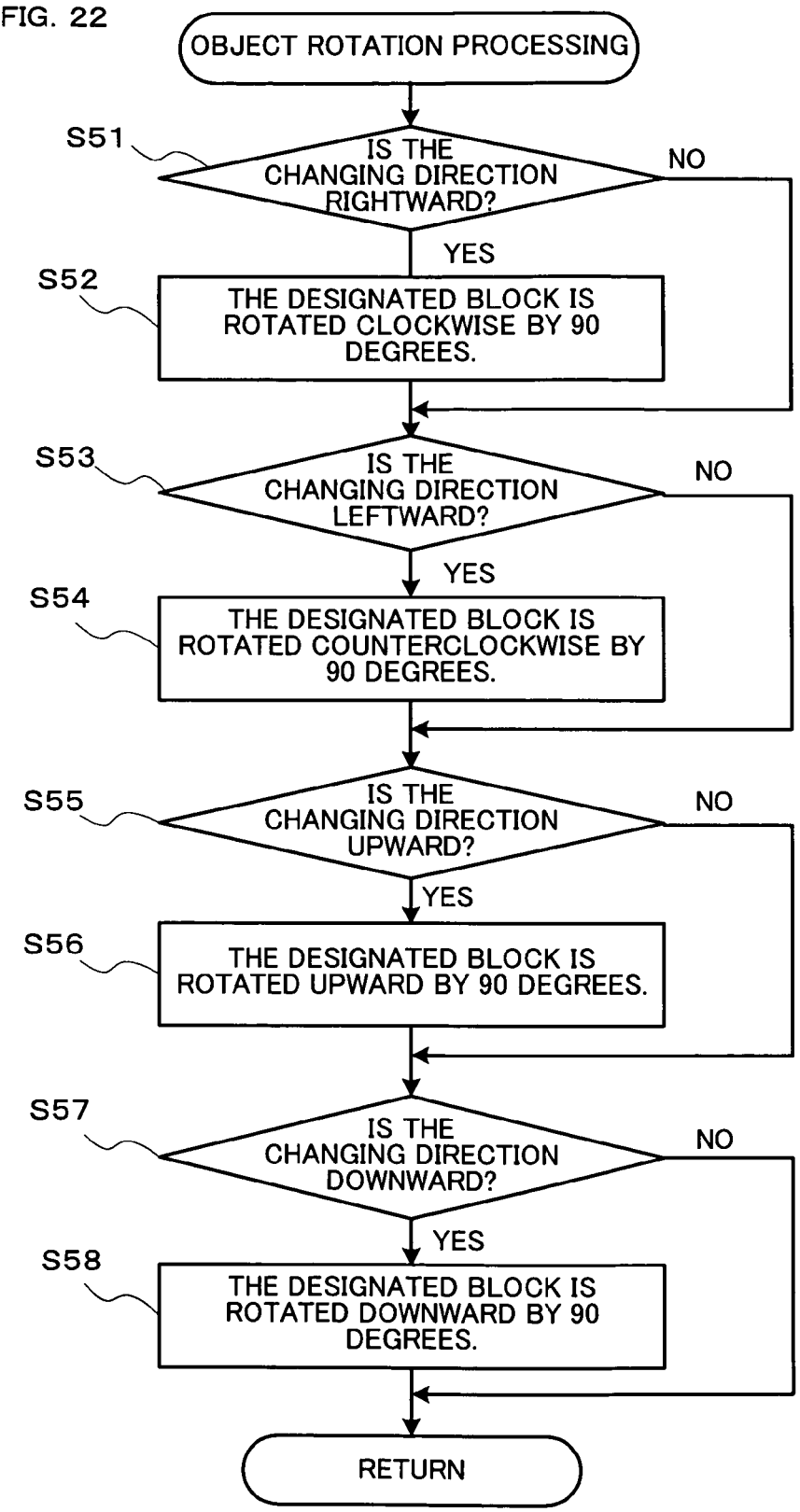

IMAGE PROCESSING APPARATUS, STORAGE MEDIUM HAVING IMAGE PROCESSING PROGRAM STORED THEREON, GAME APPARATUS AND STORAGE MEDIUM HAVING GAME PROGRAM STORED THEREON

CROSS REFERENCE TO RELATED APPLICATION

The disclosure of Japanese Patent Application No. 2005-291638 is incorporated herein by reference.

BACKGROUND OF THE INVENTION

1. Field of the Invention

The present invention relates to an image processing apparatus, a storage medium having an image processing program stored thereon, a game apparatus and a storage medium having a game program stored thereon. More specifically, the present invention relates to an image processing apparatus, a storage medium having an image processing program stored thereon, a game apparatus and a storage medium having a game program stored thereon for controlling a display state of an object displayed on a screen by operating a pointing device.

2. Description of the Background Art

According to one conventional technique for operating an object by directly touching an operation panel (tough input operation), the object is rotated in accordance with a direction in which a finger, a pen or the like is moved while kept in contact with the touch panel (drag operation) (for example, Japanese Laid-Open Patent Publications Nos. 5-100809 and 9-134269). Specifically, when the drag operation is conducted rightward, the object is rotated clockwise; and when the drag operation is conducted leftward, the object is rotated counterclockwise.

The above-described technique, which rotates an object by a drag operation, requires coordinate values to be input in succession to some extent. For this reason, this technique has problems that the operation needs a large number of steps and thus is time-consuming, and therefore it is difficult to rotate an object with a simple and quick operation. The technique has another problem that since the object is rotated by a drag operation, it is difficult to separately perform the operation to rotate the object and the operation to move the object. Generally, an object is moved by a drag operation. When the above-described technique is used to move an object, the object is indispensably rotated as well as being moved by, for example, a drag operation.

SUMMARY OF THE INVENTION

Therefore, an object of the present invention is to provide an image processing program, a game program, an image processing apparatus and a game apparatus which are capable of rotating an object with a simple and quick operation. Another object of the present invention is to provide a storage medium having stored thereon an image processing program, a storage medium having stored thereon a game program, an image processing apparatus and a game apparatus which are capable of separately performing a rotation operation and a moving operation of an object.

The present invention has the following features to attain the object mentioned above. The reference numerals, additional explanations and the like in parentheses in this section of the specification indicate the correspondence with the embodiments described later for easier understanding of the present invention and do not limit the present invention in any way.

A first aspect of the present invention is directed to a storage medium having stored thereon an image processing program for causing a computer of an image processing apparatus, including a display device (12) and a pointing device (16, 17), to execute an input coordinate value detection step (S5), a direction calculation step (S6, S28, S29), and a rotation step (S31). The display device displays, on a screen, an operation target object in a virtual space. The pointing device designates a position on the screen. The input coordinate value detection step detects an input coordinate value indicating a position on the screen designated by the pointing device every predetermined time unit. The direction calculation step, where a first input coordinate value has been detected in the input coordinate value detection step, determines whether or not there is a second input coordinate value which was detected discretely from, and before, the first input coordinate value, and when there is the second input coordinate value, calculates a changing direction based on the first input coordinate value and the second input coordinate value. The rotation step rotates the operation target object in a rotation direction in accordance with the changing direction calculated in the direction calculation step. Herein, the pointing device includes both a device capable of inputting an absolute coordinate value, such as a touch panel, and a device capable of inputting a relative coordinate value, such as a mouse.

In a second aspect of the present invention based on the first aspect, in the rotation step, when either one of the first input coordinate value and the second input coordinate value is encompassed in an area on the screen which is occupied by an operation target object, the operation target object occupying the area encompassing the either one of the first input coordinate value and the second input coordinate value is rotated.

In a third aspect of the present invention based on the first aspect, the image processing program causes the computer to further execute a time determination step (S22, S29) of determining whether or not the first input coordinate value was detected within a predetermined time duration after the second input coordinate value was detected; and in the rotation step, only when it is determined in the time determination step that the first input coordinate value was detected within the predetermined time duration after the second input coordinate value was detected, the operation target object is rotated.

In a fourth aspect of the present invention based on the first aspect, the image processing program causes the computer to further execute a distance calculation step (S28) of calculating a distance from the second input coordinate value to the first input coordinate value; and in the rotation step, an angle by which the operation target object is rotated is varied in accordance with the distance calculated in the distance calculation step. In a fifth aspect of the present invention based on the first aspect, the image processing program causes the computer to further execute an overlap check step (S49) and a rotation cancellation step (S49, S17). The overlap check step determines whether or not a position in which the operation target object rotated in the rotation step is displayed overlaps a position in which another operation target object is displayed on the screen. The rotation cancellation step, when it is determined in the overlap check step that the positions overlap, displays, on the screen, a motion of the operation target object rotating and then a motion of the operation target object returning to the position before the rotation.

In a sixth aspect of the present invention based on the first aspect, the image processing program causes the computer to further execute a continuous direction calculation step (S28)

and a moving step (S30). The continuous direction calculation step calculates a changing direction based on at least two input coordinate values detected in succession in the input coordinate value detection step. The moving step moves the operation target object in a moving direction in accordance with the changing direction calculated in the continuous direction calculation step.

In a seventh aspect of the present invention based on the sixth aspect, the image processing program causes the computer to further execute a designation determination step (S10, S26) of determining whether or not either one of the at least two input coordinate values detected in succession in the input coordinate value detection step is encompassed in an area of the screen occupied by an operation target object; and in the moving step, when it is determined in the designation determination step that either one of the at least two input coordinate values is encompassed in the area, the operation target object occupying the area encompassing the either one of the at least two input coordinate values is rotated.

In an eighth aspect of the present invention based on the seventh aspect, in the designation determination step, it is determined whether or not the input coordinate value first detected among the at least two input coordinate values detected in succession is encompassed in the area of the screen occupied by an operation target object; and in the moving step, the operation target object occupying the area encompassing the input coordinate value first detected is moved.

A ninth aspect of the present invention is directed to a storage medium having stored thereon a game program for causing a computer of a game apparatus, including a display device for displaying, on a screen, an operation target object in a virtual space and a pointing device for designating a position on the screen, to execute an input coordinate value detection step (S5), a determination step (S6, S29), a direction calculation step (S28), a rotation step (S31), a continuous direction calculation step (S28), and a moving step (S30). The input coordinate value detection step detects an input coordinate value indicating a position on the screen designated by the pointing device every predetermined time unit. The determination step, where a first input coordinate value has been detected in the input coordinate value detection step, determines whether or not there is a second input coordinate value which was detected discretely from, and before, the first input coordinate value, and determines whether or not there are at least two input coordinate values detected in succession. The direction calculation step, when it is determined in the determination step that there is the second input coordinate value, calculates a changing direction based on the first input coordinate value and the second input coordinate value. The rotation step rotates the operation target object in a rotation direction in accordance with the changing direction calculated in the direction calculation step. The continuous direction calculation step, when it is determined in the determination step that there are the at least two input coordinate values detected in succession, calculates a direction connecting the at least two input coordinate values. The moving step moves the operation target object in a moving direction in accordance with the direction calculated in the continuous direction calculation step.

A tenth aspect of the present invention is directed to an image processing apparatus including a display device (12) and a pointing device (16, 17). The image processing apparatus comprises an input coordinate value detection section (16, 31), a direction calculation section (31), and a rotation section (31). The display device displays, on a screen, an operation target object in a virtual space. The pointing device designates a position on the screen. The input coordinate value detection section detects an input coordinate value indicating a position on the screen designated by the pointing device every predetermined time unit. The direction calculation section, where a first input coordinate value has been detected by the input coordinate value detection section, determines whether or not there is a second input coordinate value which was detected discretely from, and before, the first input coordinate value, and when there is the second input coordinate value, calculates a changing direction based on the first input coordinate value and the second input coordinate value. The rotation section rotates the operation target object in a rotation direction in accordance with the changing direction calculated by the direction calculation section.

An eleventh aspect of the present invention is directed to a game apparatus including a display device for displaying, on a screen, an operation target object in a virtual space and a pointing device for designating a position on the screen. The game apparatus comprises an input coordinate value detection section (16, 31), a determination section (31), a direction calculation section (31), a rotation section (31), a continuous direction calculation section (31), and a moving section (31). The input coordinate value detection section detects an input coordinate value indicating a position on the screen designated by the pointing device every predetermined time unit. The determination section, where a first input coordinate value has been detected by the input coordinate value detection section, determines whether or not there is a second input coordinate value which was detected discretely from, and before, the first input coordinate value, and determines whether or not there are at least two input coordinate values detected in succession. The direction calculation section, when it is determined by the determination section that there is the second input coordinate value, calculates a changing direction based on the first input coordinate value and the second input coordinate value. The rotation section rotates the operation target object in a rotation direction in accordance with the changing direction calculated by the direction calculation section. The continuous direction calculation section, when it is determined by the determination section that there are the at least two input coordinate values detected in succession, calculates a direction connecting the at least two input coordinate values. The moving section moves the operation target object in a moving direction in accordance with the direction calculated by the continuous direction calculation section.

According to the first aspect, an operation target object can be rotated with a simple and quick operation.

According to the second aspect, an operation target object can be rotated with an intuitive and simple operation.

According to the third aspect, only when the first and second input coordinate values are acquired within a predetermined time duration, the operation target object is rotated. Therefore, the user is requested to perform a quick operation. Thus, an unintended rotation operation is prevented from being performed due to a slow input operation.

According to the fourth aspect, the amount by which the operation target object is rotated can be varied in accordance with the distance from the first coordinate value to the second coordinate value. Thus, the user can adjust the rotation amount intuitively, and therefore can rotate operation target object in a more complex manner with a simple procedure.

According to the fifth aspect, when the operation target object starts rotating but appears to collide against another operation target object before being completely rotated, the operation target object is displayed as returning to the original state. Therefore, the user can be easily notified that the operation target object cannot be rotated as intended.

According to the sixth aspect, an operation to rotate an operation target object and an operation to move the operation target object can be separately performed with a simple and quick operation.

According to the seventh and eighth aspects, an operation target object can be moved with an intuitive and simple operation.

According to the ninth aspect, substantially the same effects as provided by the first and sixth aspects can be provided.

According to the tenth aspect, substantially the same effect as provided by the first aspect can be provided.

According to the eleventh aspect, substantially the same effects as provided by the ninth aspect can be provided.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 schematically shows an example of a block table;
FIG. 22 is a flowchart illustrating object rotation processing in detail.

DESCRIPTION OF THE PREFERRED EMBODIMENTS

Hereinafter, the present invention will be described by way of embodiments with reference to the drawings. The following embodiments do not limit the present invention in any way.

First Embodiment

Figure 1:
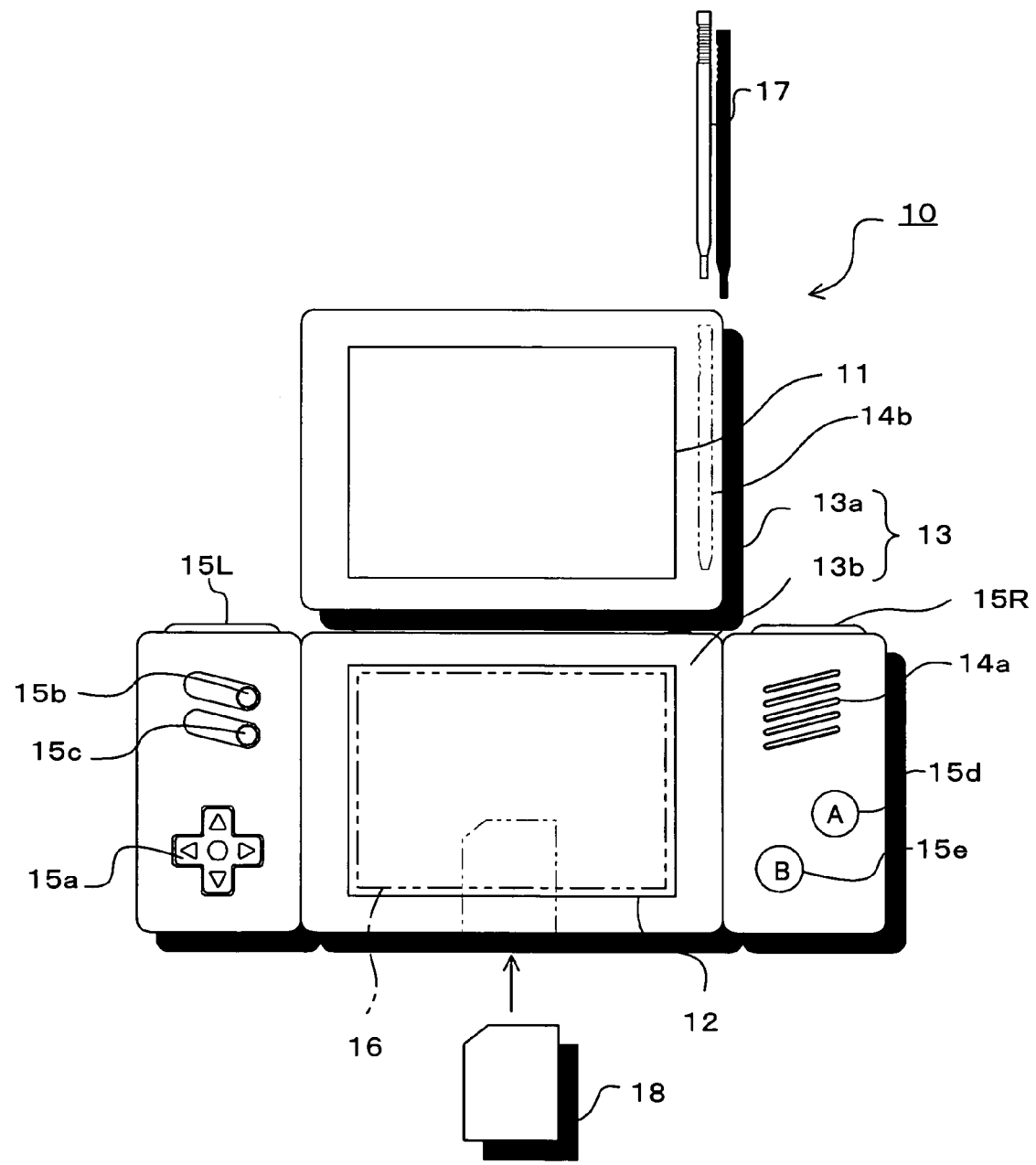
FIG. 1 is an external view of a mobile game apparatus 10 according to an embodiment of the present invention.

FIG. 1 is an external view of a mobile game apparatus 10 according to a first embodiment of the present invention. As shown in FIG. 1, the game apparatus 10 in this embodiment includes two liquid crystal displays (LCDs) 11 and 12 which are accommodated in a housing 13 at predetermined positions. Specifically, in the case where the LCD 11 (first LCD) and the LCD 12 (second LCD) are accommodated in a vertically stacking manner, the housing 13 includes an upper housing 13a and a lower housing 13b. The upper housing 13a is pivotably supported by a part of an upper surface of the lower housing 13b. The upper housing 13a has a planar shape slightly larger than a planar shape of the first LCD 11, and has an opening for exposing a display screen of the first LCD 11 on one main surface thereof. The lower housing 13b has a planar shape longer in the horizontal direction than the planar shape of the upper housing 13a, and has an opening for exposing a display screen of the second LCD 12 at approximately the center of the lower housing 13b in the horizontal direction. One of two side sections of the lower housing 13b interposing the second LCD 12 has speaker holes 14a, and each of the two side sections has an operation switch section 15.

The operation switch section 15 includes a direction instruction switch 15a, a start switch 15b, and a select switch 15c which are attached to one main surface of the side section of the lower housing 13b to the left of the second LCD 12 as seen in FIG. 1. The operation switch section 15 also includes motion switches 15d and 15e which are attached to one main surface of the side section of the lower housing 13b to the right of the second LCD 12 as seen in FIG. 1. The direction instruction switch 15a is used, for example, for instructing a moving direction of a player object (or a player character) operable by the player or for instructing a moving direction of a cursor. The motion switches 15d and 15e are used for inputting motions other than the instructions on directions, for example, for inputting an instruction to jump, punch, move a weapon, etc. in an action game, and for inputting an instruction to obtain an item or to select and determine a weapon or a command, etc. in a roll playing game (RPG) or a simulation RPG. When necessary, the lower housing 13b may further include an additional motion switch(es), or side surface switches 15L and 15R which are respectively provided on upper surfaces of the side sections of the lower housing 13b to the left and to the right of the second LCD 12.

On a front surface of the second LCD 12, a touch panel 16 is provided. The touch panel 16 is of, for example, any of a resistance film system, an optical (infrared) system, and a static capacitance coupling system. When a stick 17 (or a finger) presses, moves on, or touches an upper surface of the touch panel 16, the coordinate position of the stick 17 is detected and the coordinate data is output.

In the vicinity of a side surface of the upper housing 13a, an accommodation hole 14b is formed when necessary for accommodating the stick 17 for operating the touch panel 16. The stick 17 is accommodated in the accommodation hole 14b. In a part of one side surface of the lower housing 13b, a cartridge insertion section (represented by the thin two-dot chain line in FIG. 1) is formed, for detachably accepting a memory card 18 having a built-in memory (e.g., a ROM) which stores a game program. A part of the lower housing 13b inner to the cartridge insertion section has a built-in connecter (represented by reference numeral 33 in FIG. 2) to be electrically connected with the memory card 18. The lower housing 13b (or the upper housing 13a) accommodates an electronic circuit board (represented by reference numeral 30 in FIG. 2) having various electronic components such as a CPU and the like mounted thereon. The information storage medium for storing the game program is not limited to a nonvolatile semiconductor memory such as a ROM or a flash memory, and may be a CD-ROM, a DVD, or a similar optical disc-shaped storage medium.

Figure 2:
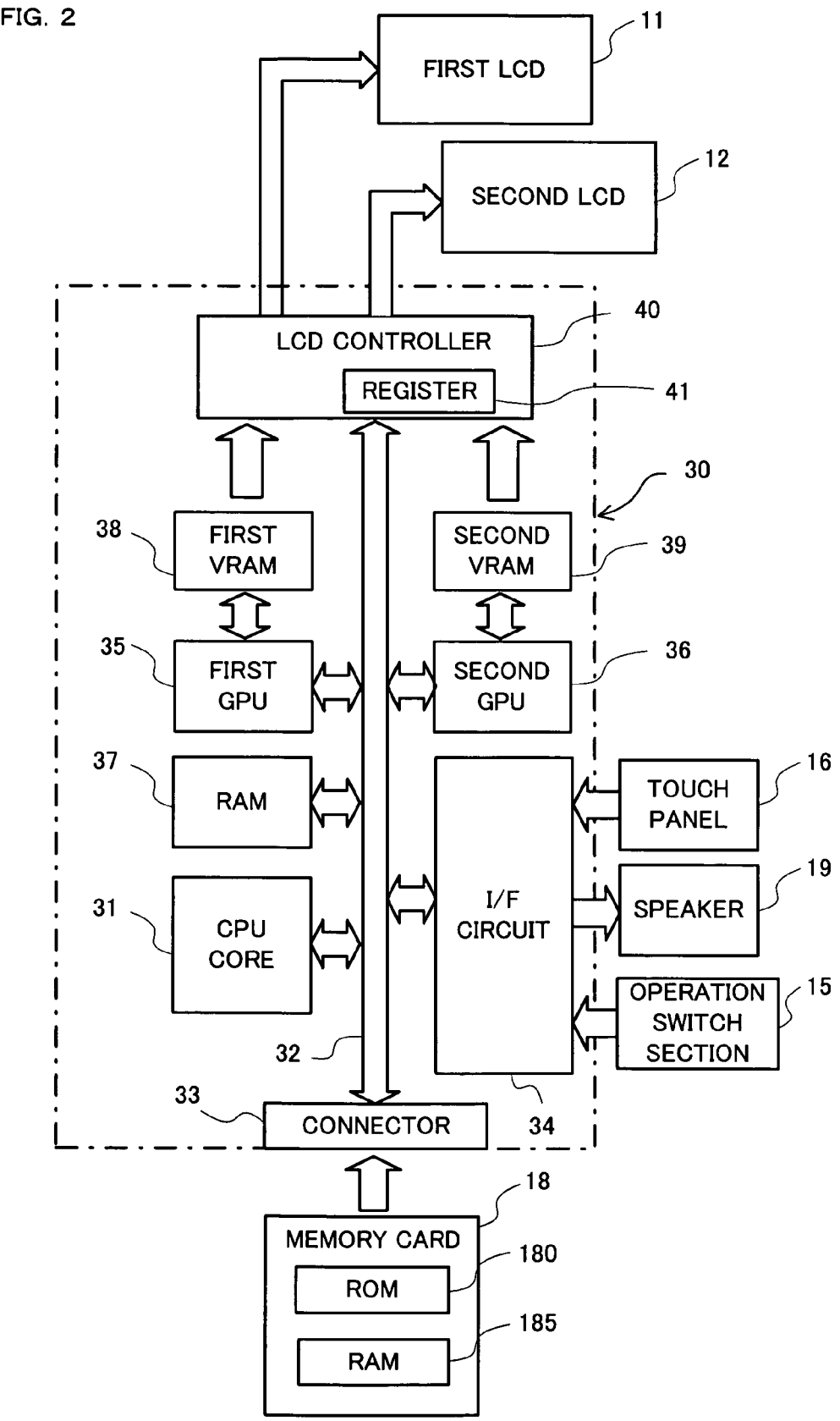
FIG. 2 is a block diagram of the mobile game apparatus 10 according to the embodiment of the present invention.

FIG. 2 is a block diagram of the mobile game apparatus 10. As shown in FIG. 2, the electronic circuit board 30 accommodated in the housing 13 has a CPU core 31 mounted thereon. The CPU core 31 is connected to the connector 33, an input/output interface (I/F) circuit 34, a first graphic processing unit (first GPU) 35, a second graphic processing unit (second GPU) 36, a RAM 37, and an LCD controller 40 via a bus 32. To the connecter 33, the memory card 18 is detachably connectable. As described above, the memory card 18 is a storage medium for storing a game program. Specifically, the memory card 18 has a ROM 180 for storing the game program and a RAM 185 for rewritably storing backup data mounted thereon. The game program stored on the ROM 180 in the memory card 18 is loaded on the RAM 37, and the game program loaded on the RAM 37 is executed by the CPU core 31. Temporary data and data for generating an image, which can be obtained by the CPU core 31 through execution of the game program, are stored on the RAM 37. The I/F circuit 34 is connected to the operation switch section 15, the touch panel 16, and a speaker 19. The speaker 19 is located at a position inside the speaker holes 14a described above.

The first GPU 35 is connected to a first video RAM (hereinafter, referred to as the "first VRAM") 38, and the second GPU 36 is connected to a second video RAM (hereinafter, referred to as the "second VRAM") 39. In accordance with an instruction from the CPU core 31, the first GPU 35 generates a first game image based on data for generating an image stored on the RAM 37, and draws the generated first game image on the first VRAM 38. In accordance with an instruction from the CPU core 31, the second GPU 36 generates a second game image based on data for generating an image stored on the RAM 37, and draws the generated second game image on the second VRAM 39. The first VRAM 38 and the second VRAM 39 are connected to the LCD controller 40.

The LCD controller 40 includes a register 41. The register 41 stores the value of 0 or 1 in accordance with an instruction from the CPU core 31. When the value of the register 41 is 0, the LCD controller 40 outputs the game image drawn on the first VRAM 38 to the first LCD 11 and outputs the game image drawn on the second VRAM 39 to the second LCD 12. When the value of the register 41 is 1, the LCD controller 40 outputs the game image drawn on the first VRAM 38 to the second LCD 12 and outputs the game image drawn on the second VRAM 39 to the first LCD 11. The I/F circuit 34 passes data between external input and output devices including the operation switch section 15, the touch panel 16 and the speaker 19, and the CPU core 31. The touch panel 16 (including a device driver for the touch panel) outputs data on a coordinate position corresponding to the position which is input (designated) by the stick 17. In this embodiment, the resolution of the display screen is 256 dots×192 dots, and the detection precision of the touch panel 16 is also 256 dots×192 dots in correspondence with the resolution of the display screen. The detection precision of the touch panel 16 may be lower or higher than the resolution of the display screen.

Figure 3:
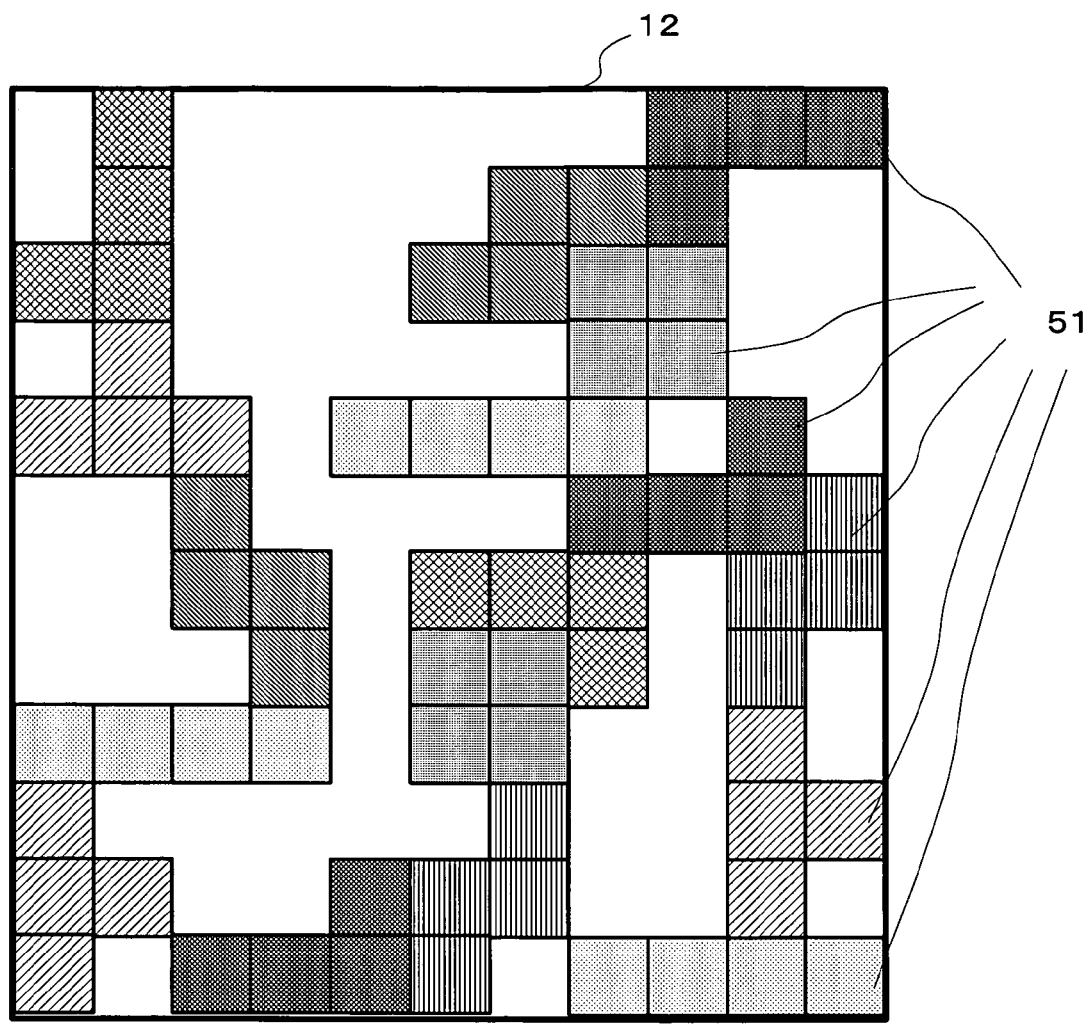
FIG. 3 shows an exemplary game screen of a game assumed in the embodiment of the present invention.

Next, with reference to FIG. 3, an overview of a game assumed in this embodiment will be described. FIG. 3 shows an exemplary game screen of a game assumed in this embodiment. Referring to FIG. 3, the LCD 12 displays a plurality of square objects. Each four of the square objects form one operation target object 51 (hereinafter, referred to as a "block 51"). The blocks 51 have seven different shapes, and are displayed on the LCD 12 as being stacked randomly. The game assumed in this embodiment aims at arranging the square objects in one transverse line by moving or rotating the blocks 51 by an operation described later. When the square objects are arranged in one transverse line from the left end to the right end, that line of square objects disappears. Then, a block or blocks 51 stacking on this line fall down. In this manner, the square objects are arranged in one transverse line and erased by moving or rotating the blocks 51. When predetermined square objects displayed in an upper part of the screen of the LCD 12 (which are not initially displayed on the LCD 12, but appear on the screen of the LCD 12 and gradually come down by erasing the square objects) finally disappear, the game is over.

Figure 4:
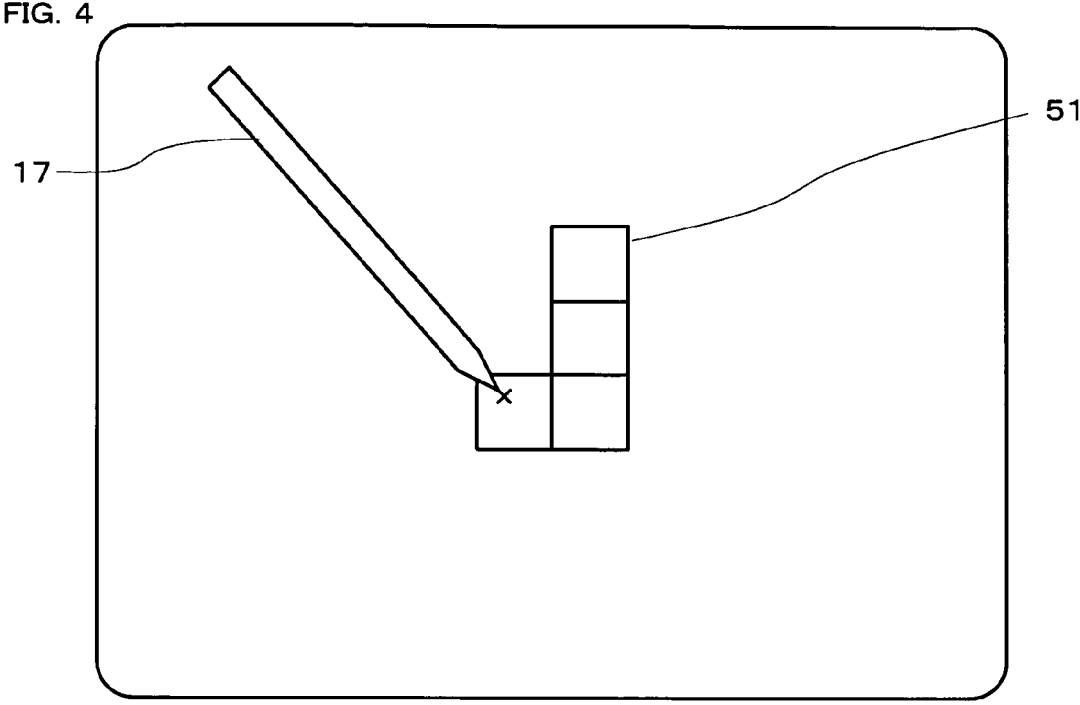
FIG. 4 illustrates a drag operation.
Figure 5:
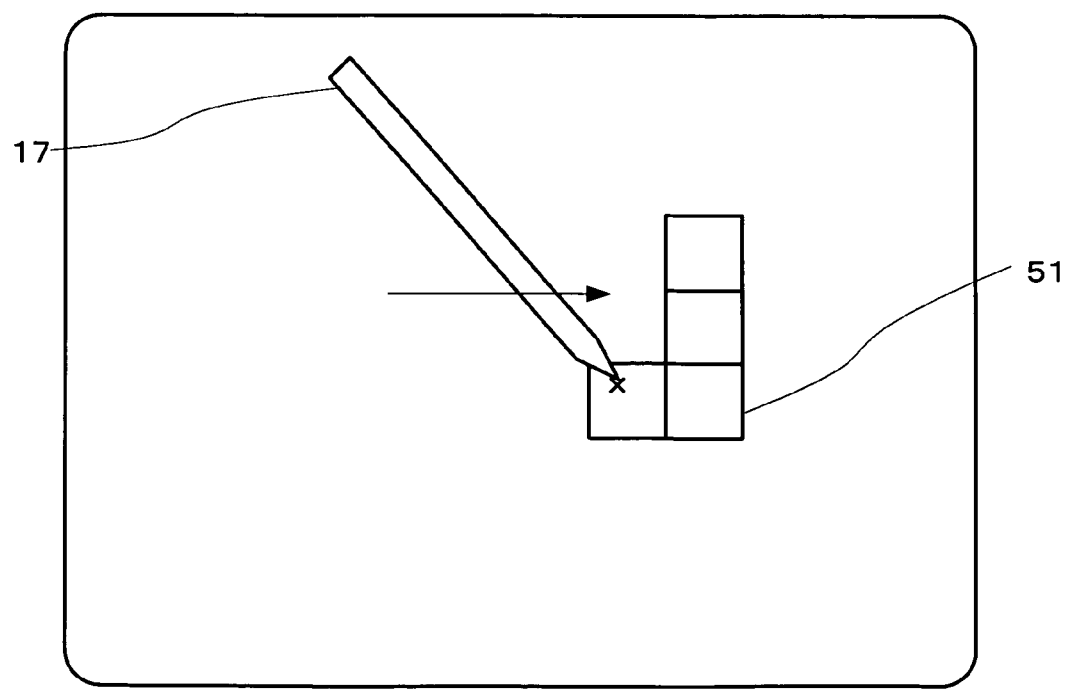
FIG. 5 illustrates a drag operation.

Next, with reference to FIG. 4 through FIG. 7, operations on blocks 51 in the game assumed in this embodiment will be described. There are roughly two types of operations for this game. One is an operation to move a block 51 rightward or leftward, and the other is an operation to rotate a block 51. A block 51 of interest can be moved by a drag operation (an operation of detecting input coordinate values in succession) using the stick 17 or the like. Referring to FIG. 4, first, an arbitrary position on the block 51 of interest is pressed with the stick 17 (tap operation). The stick 17 is moved rightward without being taken off from the touch panel 16. Thus, as shown in FIG. 5, the block 51 can be moved rightward. For moving the block 51 leftward, the stick 17 is moved leftward while kept in contact with the touch panel 16.

Figure 6:
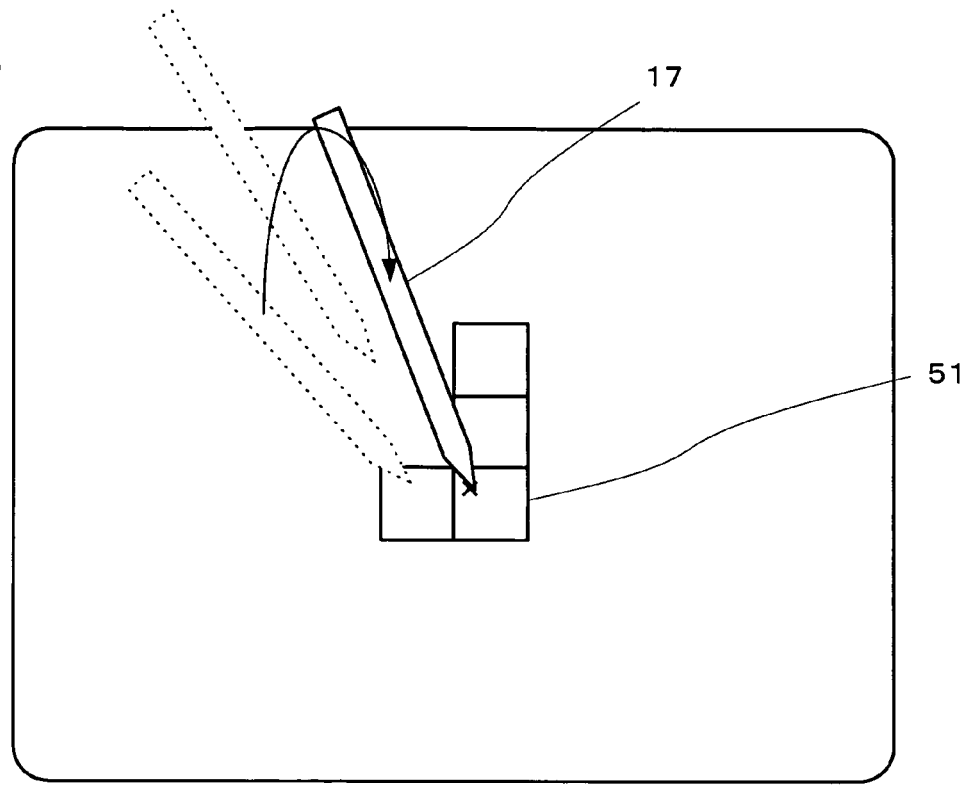
FIG. 6 illustrates a rotation operation.
Figure 7:
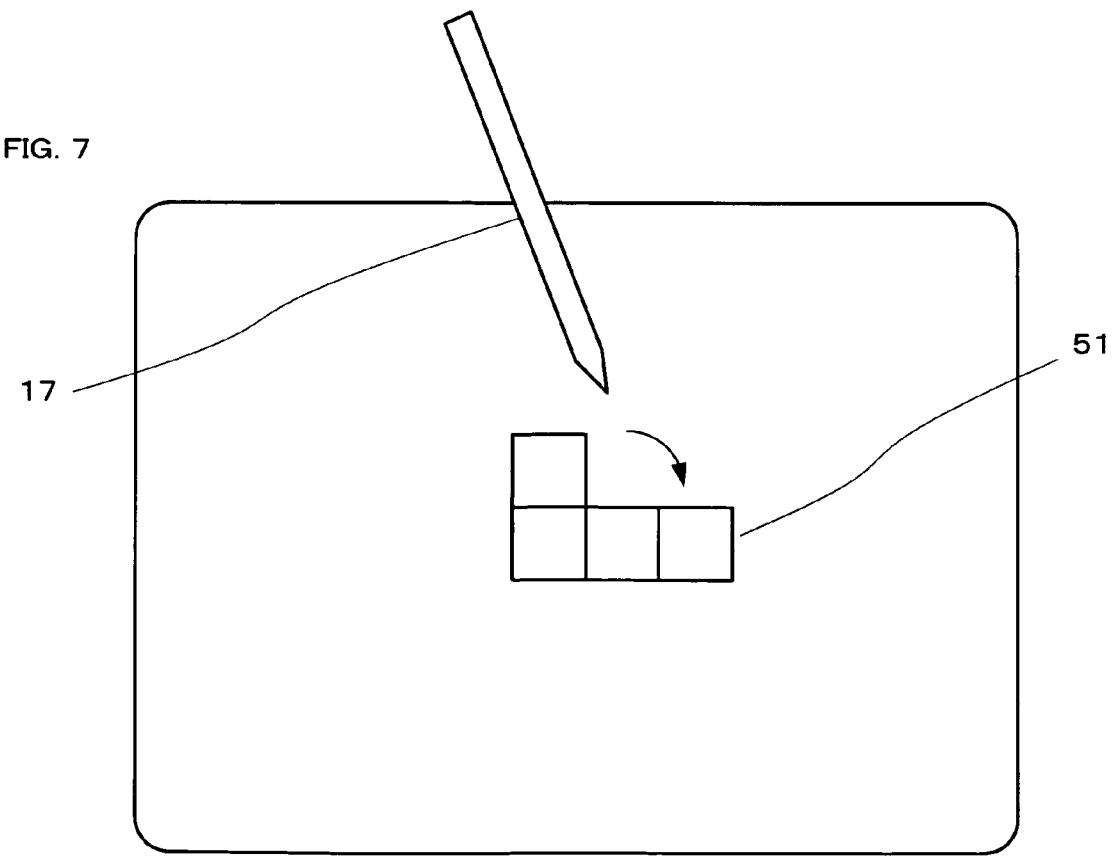
FIG. 7 illustrates a rotation operation.

Now, the operation to rotate a block 51 will be described. In this game, a block 51 can be rotated by a double tap operation. By the double tap operation, the tap operation is performed twice in succession; i.e., input coordinate values are detected discretely. The double tap operation corresponds to a double click on a mouse. For example, a block 51 can be rotated clockwise as follows. First, as shown in FIG. 4, an arbitrary position (a lower left position in FIG. 4) on the block 51 of interest is pressed with the stick 17 (tap operation). Next, the stick 17 is taken off from the touch panel 16, and the same block is again pressed with the stick 17 within a predetermined time duration. The block is pressed the second time at a different position from the first time, and the position to be pressed is determined in accordance with the direction in which the block 51 is to be rotated. Referring to FIG. 6, in order to rotate the block 51 clockwise, a position which is right to the position pressed the first time is pressed (FIG. 6). Thus, the block 51 rotates clockwise by 90 degrees (FIG. 7). In this manner, the block 51 is rotated in accordance with the positional relationship between the first position tapped and the second position tapped in the double tap operation. In other words, when the second position tapped is right to the first position tapped, the block 51 is rotated clockwise; and when the second position tapped is left to the first position tapped, the block 51 is rotated counterclockwise. In this game, the blocks 51 are rotated only clockwise or counterclockwise.

Figure 8:
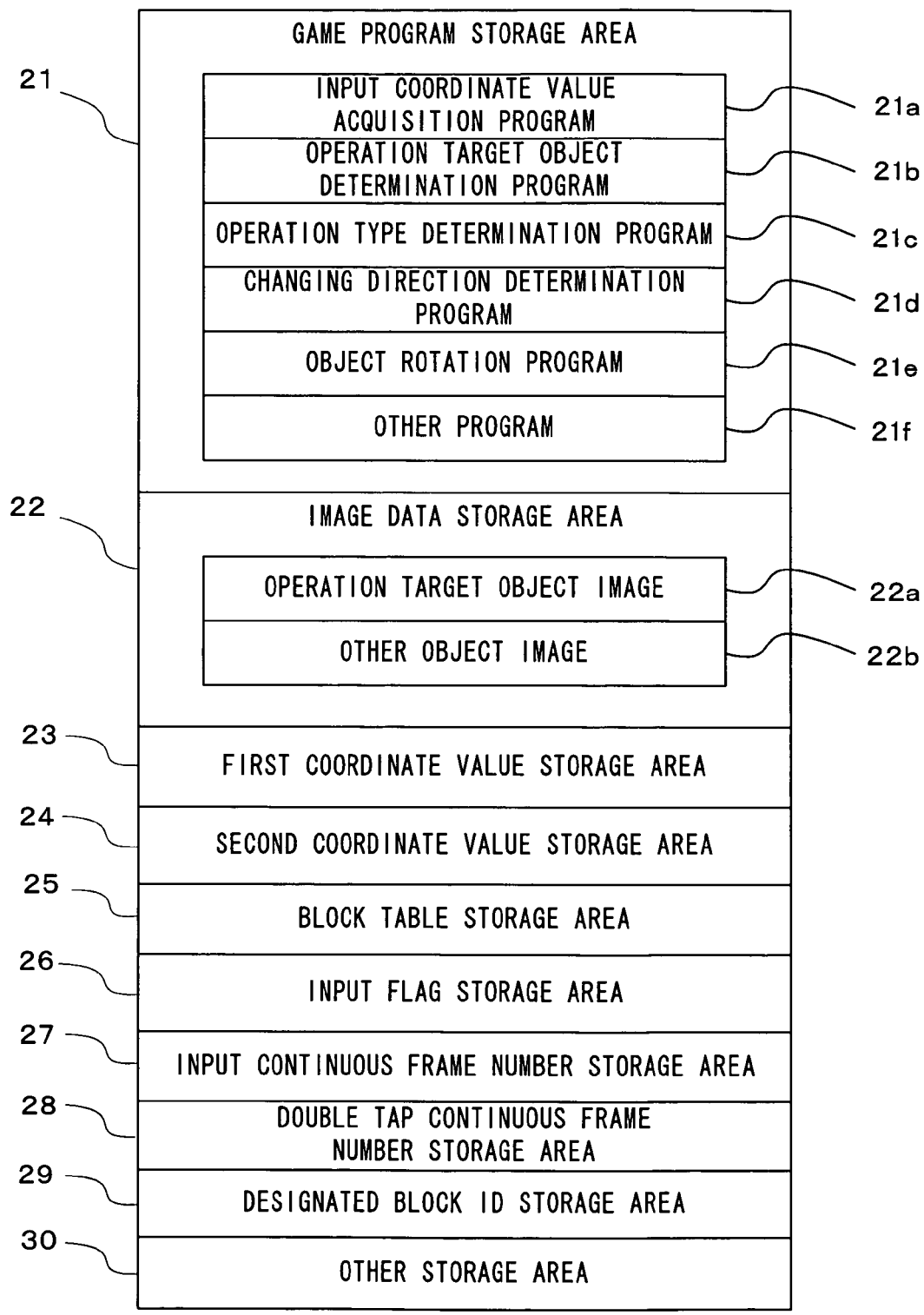
FIG. 8 is a memory map graphically illustrating a memory area of a RAM 37 shown in FIG. 2.

Next, various data used in this embodiment will be described. FIG. 8 is a memory map graphically showing a memory area of the RAM 37. As shown in FIG. 8, the RAM 37 includes, as storage areas, a game program storage area 21, an image data storage area 22, a first coordinate value storage area 23, a second coordinate value storage area 24, a block table storage area 25, an input flag storage area 26, an input continuous frame number storage area 27, a double tap continuous frame number storage area 28, a designated block ID storage area 29, and an other storage area 30.

In the game program storage area 21, programs necessary for performing image processing of the game or the like, game data in accordance with the game content, and the like are stored. More specifically, in the game program storage area 21, programs 21a through 21f which are operation programs of the CPU core 31 (programs for causing the CPU core 31 to execute the operations corresponding to the flowchart shown in FIG. 10 described later) are stored.

An input coordinate value acquisition program 21a is for acquiring a coordinate value on the LCD 12 corresponding to the coordinate position on the touch panel 16 pressed by the user. An operation target object determination program 21b is for determining whether or not the input coordinate value acquired by the input coordinate value acquisition program 21a is encompassed in an area of any block 51 displayed on the LCD 12. In other words, the operation target object determination program 21b determines whether or not the user has designated any block 51 with the stick 17 or the like.

An operation type determination program 21c is for determining the type of the input operation; for example, whether the input operation performed by the user is a drag operation or a double tap operation.

A changing direction determination program 21d is for, when the input operation performed by the user is the double tap operation, determining the positional relationship between a coordinate value input by the first tap operation and a coordinate value input by the second tap operation in the double tap operation.

An object rotation program 21e is for rotating the block 51 in accordance with the positional relationship determined by the changing direction determination program 21d.

An other program 21f is for performing sound control processing of generating sound effect or music, or processing when the game is over (for example, processing of detecting a game-over state or processing of storing backup data of the game state obtained so far when the game is over).

In the image data storage area 22, image data 22a and 22b of images to be displayed on the LCD 11 and the LCD 12 are stored. Operation target object image data 22a is image data of a block 51 displayed on the LCD 12 as an operation target object to be operated by the player. Other object image data 22b is image data of, for example, a plurality of background (or still) objects.

In the first coordinate value storage area 23, the input coordinate value input by the first tap operation in the double tap operation is stored. In the second coordinate value storage area 24, the coordinate value input by the second tap operation in the double tap operation is stored.

In the block table storage area 25, a block table is stored. The block table associates a range of coordinate values on the LCD 12 occupied by each block 51 displayed thereon and a block ID provided for identifying each block 51. FIG. 9 schematically shows an example of the block table. FIG. 9 corresponds to the game screen shown in FIG. 3. Namely, the entire display area of the LCD 12 is divided into squares each having the same size as that of the square object. In order to identify which block 51 is formed of which squares, each square is assigned a block ID. For example, a block 51 of block ID4 is formed of four square objects arranged in one transverse line and is displayed at the lower right corner of the LCD 12 (in FIG. 9, four squares from the right in the lowermost line). A square having block ID0 indicates that there is no block in that position.

In the input flag storage area 26, an input flag indicating whether or not the touch panel 16 is pressed by the user is stored. In this embodiment, when the input flag is off, the touch panel 16 is not pressed; and when the input flag is on, the touch panel 16 is pressed.

In the input continuous frame number storage area 27, the number of frames which represents a time duration in which the touch panel 16 is kept pressed is stored. For example, where one frame is 1/30 seconds, when the touch panel 16 is kept pressed for one second, the input continuous frame number is 30.

In the double tap continuous frame number storage area 28, the number of frames which represents a time duration from the completion of the first input until the start of the second input is stored.

In the designated block ID storage area 29, a designated block ID is stored. The designated block ID is the block ID of the block pressed by the user, i.e., the block that the user intends to operate.

In the other storage area 30, data obtained during the execution of the programs, various types of flags other than the above-mentioned flag, or the like are stored.

Figure 10:
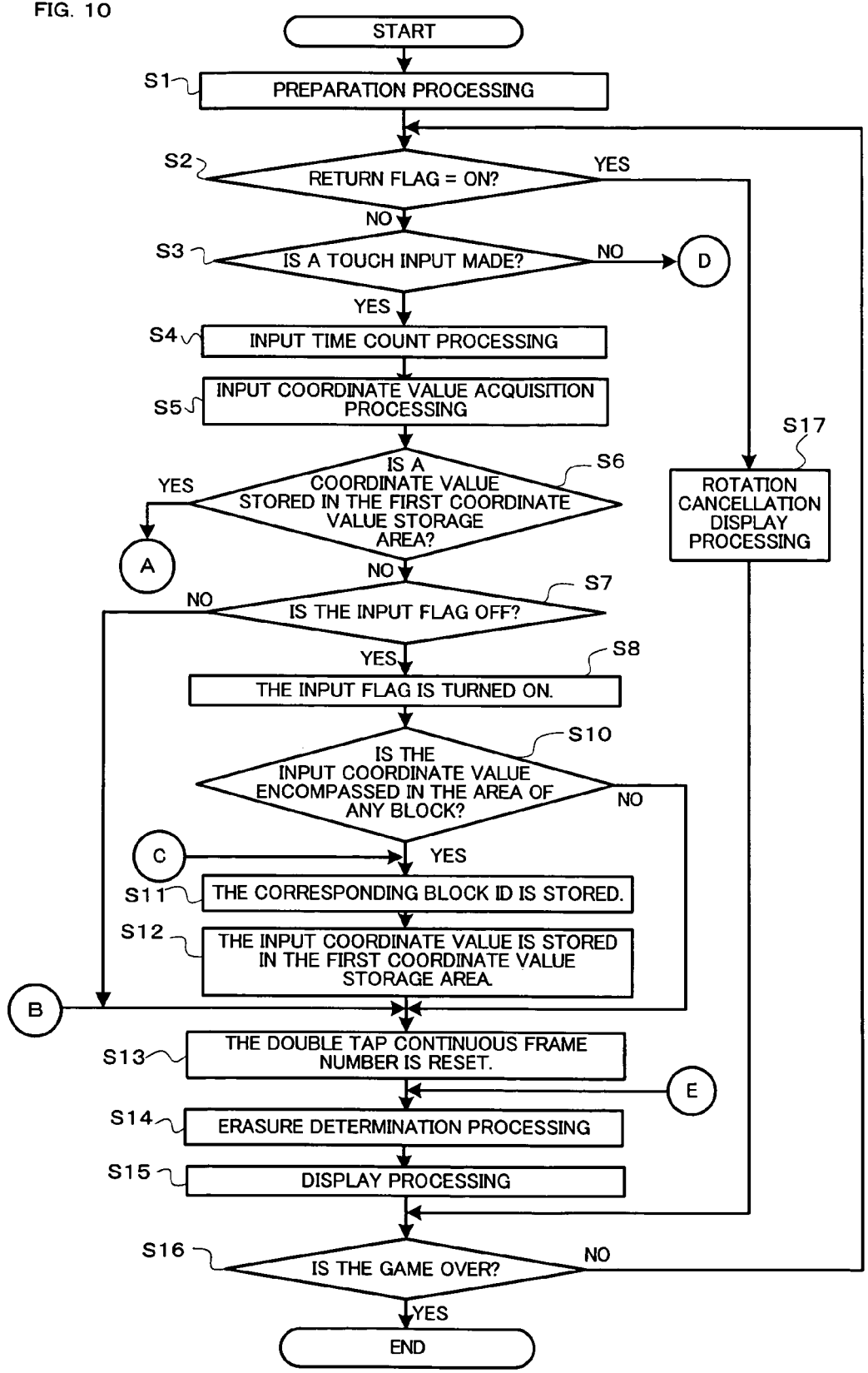
FIG. 10 is a flowchart of a main routine illustrating an overall operation of the mobile game apparatus 10 according to an embodiment of the present invention.
Figure 11:
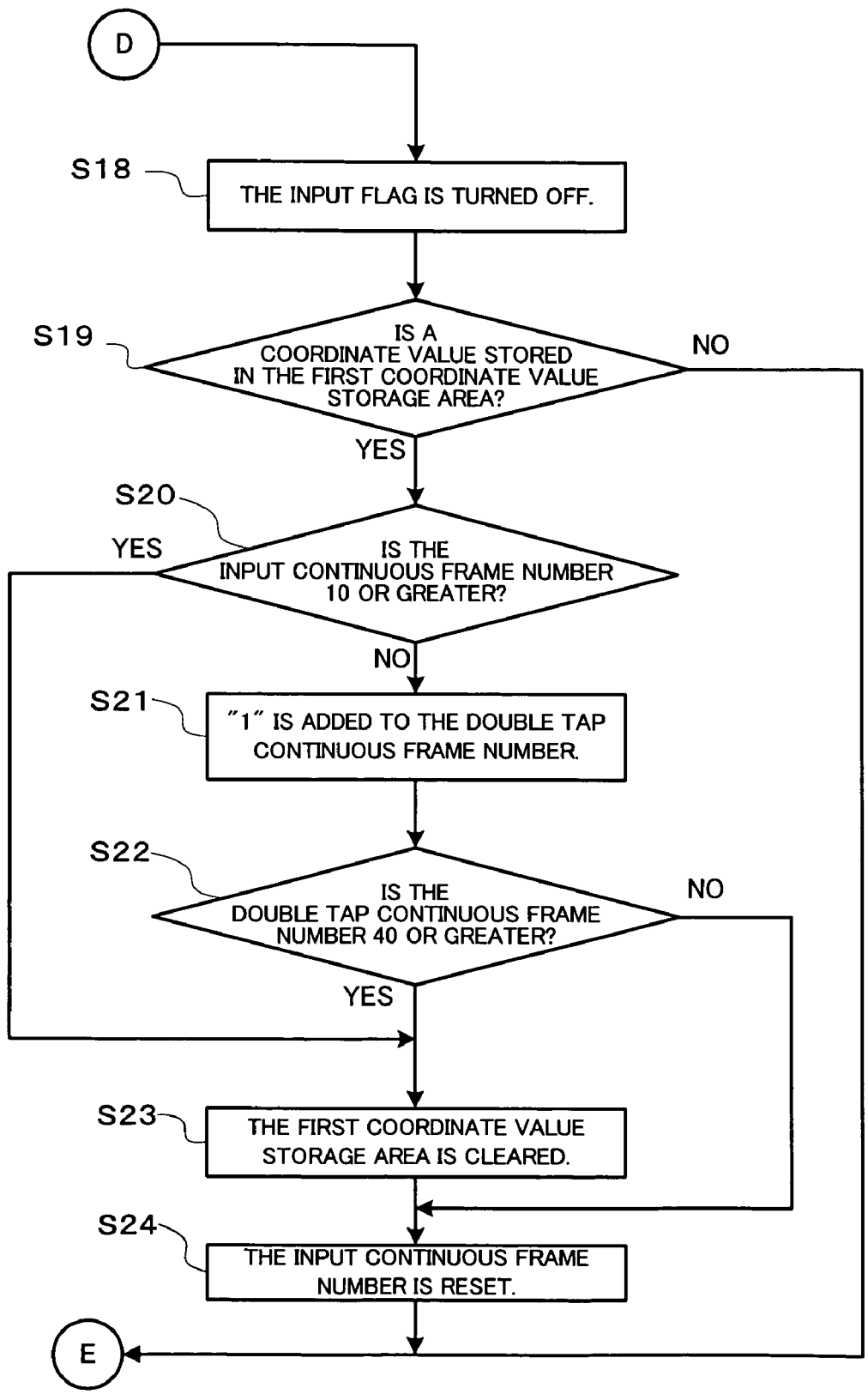
FIG. 11 is a flowchart of the main routine illustrating the overall operation of the mobile game apparatus 10 according to the embodiment of the present invention.
Figure 12:
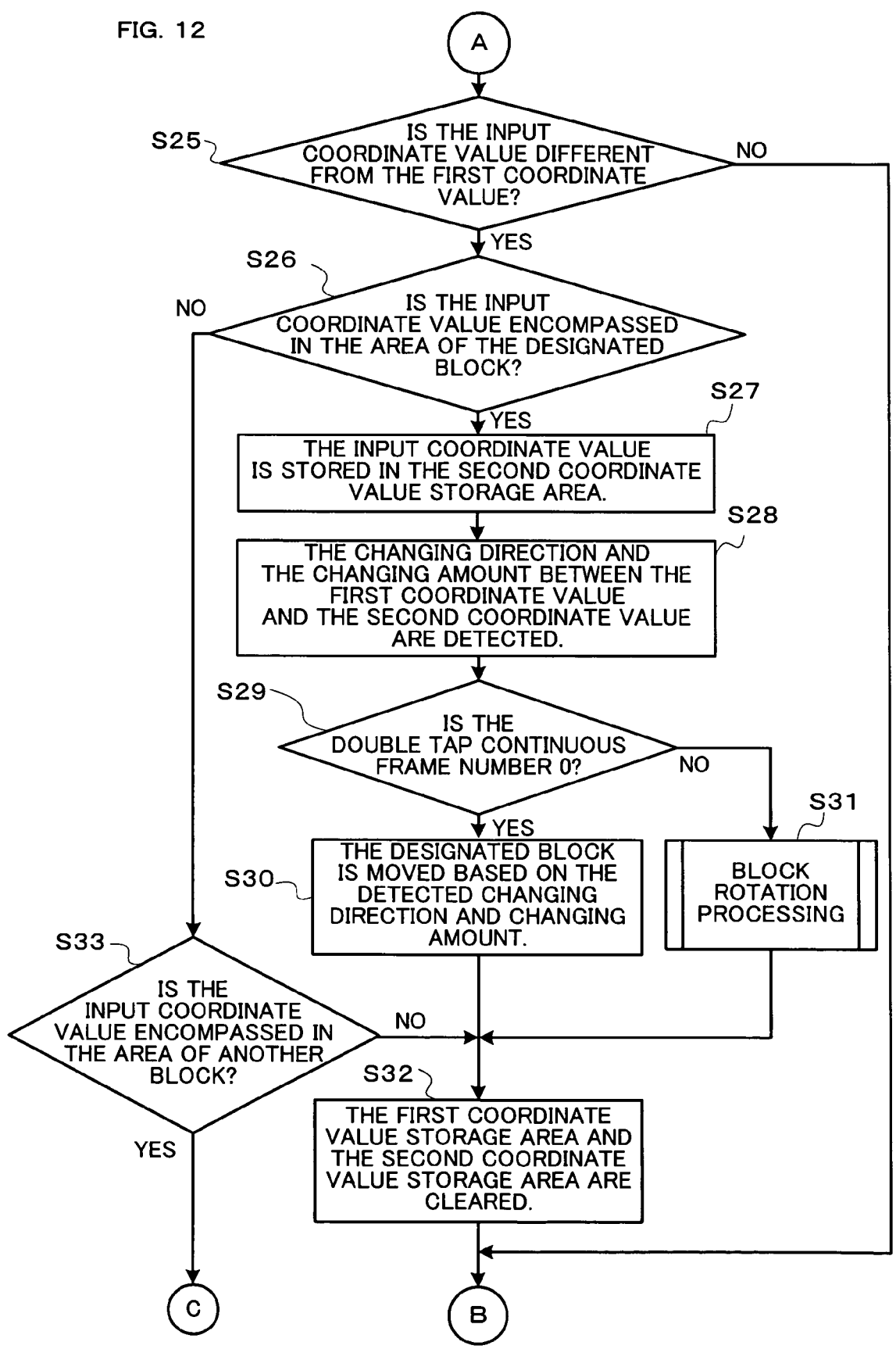
FIG. 12 is a flowchart of the main routine illustrating the overall operation of the mobile game apparatus 10 according to the embodiment of the present invention.
Figure 13:
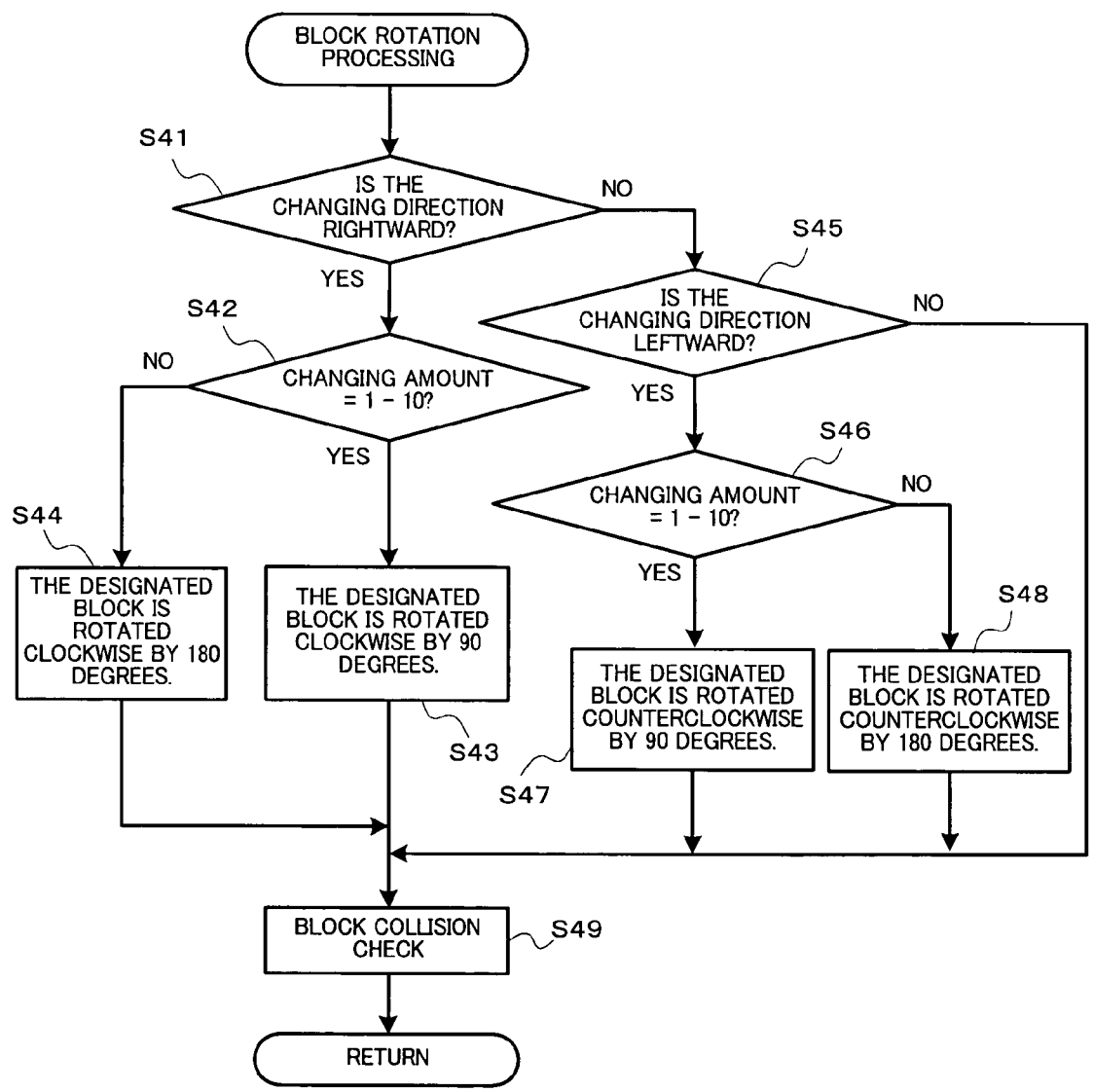
FIG. 13 is a flowchart illustrating block rotation processing in step S31 shown in FIG. 12 in detail.

With reference to FIG. 10 through FIG. 13, game processing executed by the mobile game apparatus 10 will be described. FIG. 10 through FIG. 12 show a flowchart illustrating the entire game processing executed by the mobile game apparatus 10. FIG. 13 is a flowchart illustrating a subroutine of block rotation processing in detail. The scan time of the game processing shown in FIG. 10 is 1 frame.

With reference to FIG. 10, preparation processing is executed before starting the game processing (step S1). Specifically, the CPU core 31 generates blocks 51 to be displayed on the screen and assigns a unique block ID to each block 51. Next, the CPU core 31 locates the blocks 51 in the display area of the screen randomly, and associates the area of each block 51 and a block ID to create a block table as described above (see FIG. 9). Then, image drawing processing on the LCD 12 is executed by reading a block 51 as an operation target object and another object (for example, a background image) from the image data storage area 22 of the RAM 37 and displaying the objects on the LCD 12. At this point, various flags are initialized. As a result of the above-described preparation processing, the blocks 51 stacking randomly are displayed on the LCD 12 as shown in FIG. 3. Then, it is determined whether or not a return flag is on (step S2). The return flag indicates whether or not cancellation of rotation of a block 51 is to be displayed as described later. When the return flag is determined to be off ("NO" in step S2), the processing advances to step S3. When the return flag is determined to be on ("YES" in step S2), rotation cancellation display processing is executed (step S17). The processing in step S17 will be described later.

Next, it is determined whether or not an input to the touch panel 16 has been made by the user (step S3). When it is determined there has been no input ("NO" in step S3), an input flag is turned off (step S18 in FIG. 11). Then, it is determined whether or not a coordinate value is stored in the first coordinate value storage area 23 (step S19). Namely, it is determined whether or not the first tap operation of the double tap operation has been performed. More specifically, when any coordinate value is stored in the first coordinate value storage area 23, the double tap operation is being performed (the first tap operation has been performed). When no coordinate value is stored, the double tap operation is not being performed (no input has been made to the touch panel 16, or 40 or more frames have passed since the first tap operation was completed). In step S19, it is determined whether or not any input coordinate value was detected by an input to the touch pane 116 in the past. When it is determined that no coordinate value is stored ("NO" in step S19), the processing directly advances to step S14. When any coordinate value is stored ("YES" in step S19), it is determined whether or not the input continuous frame number is 10 or greater (step S20). This is performed in order to determine whether or not the first tap operation which has been performed is effective for the double tap operation. When the input continuous frame number is 10 or greater ("YES" in step S20; for example, the touch panel 16 is kept pressed for 10 frames or greater), the first tap operation is determined not to be effective for the double tap operation. When the input continuous frame number is less than 10 ("NO" in step S20), it is determined that the first tap operation effective for the double tap operation has been completed. In this case, "1" is added to the double tap continuous frame number (step S21). Then, it is determined whether or not the double tap continuous frame number is 40 or greater (step S22). This is performed in order to determine whether or not the double tap operation is successful. In this embodiment, even if the tap operation is performed twice, unless the time duration from the completion of the first tap operation until the start of the second tap operation is less than 40 frames, it is not recognized that the double tap operation has been performed. When the double tap continuous frame number is determined to be 40 or greater ("YES" in step S22), the double tap operation is recognized as unsuccessful and the first coordinate value storage area 23 is cleared (step S23). Then, the input continuous frame number is reset; i.e., set to 0 (step S24). When the double tap continuous frame number is determined to be less than 40 ("NO" in step S22), the processing directly advances to step S24.

Returning to FIG. 10, when it is determined in step S3 that an input to the touch panel 16 has been made by the user ("YES" in step S3), input time count processing is executed for measuring the time duration in which the input is continued (step S4). Specifically, "1" is added to the above-mentioned input continuous frame number.

Next, input coordinate value acquisition processing is executed (step S5). By this processing, a coordinate value on the LCD 12 corresponding to the position pressed on the touch panel 16 (such a coordinate value will be referred to as an "input coordinate value") is acquired.

Next, it is determined whether or not any coordinate value is stored in the first coordinate value storage area 23 (step S6). The processing in step S6 is substantially the same as that of step S19. When no coordinate value is stored in the first coordinate value storage area 23 ("NO" in step S6), it is determined whether or not the input flag is off (step S7). Namely, it is determined whether an input to the touch panel 16 has been newly made or the input to the touch panel 16 is continued (the touch panel 16 is kept pressed). When the input flag is on ("NO" in step S7), the processing directly advances to step S13 described later.

When the input flag is off ("YES" in step S7), this means that an input to the touch panel 16 has been newly made, and therefore the input flag is turned on (step S8).

Next, it is determined whether or not the input coordinate value is encompassed in an area of any block 51 displayed on the LCD 12 (step S10). Specifically, the block table (see FIG. 9) is referred to, and it is determined whether or not the block ID of the area at the coordinate value corresponding to the input coordinate value is 0. When the block ID is determined to be 0 ("NO" in step S10), this means that no block exists in this area and the processing directly advances to step S13. When the block ID is determined not to be 0 ("YES" in step S10), the block ID of the area at the coordinate value corresponding to the input coordinate value is stored as the designated block ID in the designated block ID storage area 27 (step S11). Then, the input coordinate value is stored in the first coordinate value storage area 23 (step S12).

After step S12, the double tap continuous frame number is reset; i.e., set to 0 (step S13). Next in step S14, erasure determination processing is executed. By this processing, it is determined whether or not there are square objects arranged in one transverse line from the left end to the right end, such square objects are erased, and the block table is updated so as to reflect the results of moving or rotating the blocks 51. Then, processing of displaying a game image is executed (step S15). Specifically, for example, it is displayed that square objects are erased or a block is moved, or an animation is displayed in which a block is rotated in accordance with the angle determined by the block rotation processing described later. After step S15, it is determined in step S16 whether or not the game is to be over. When "YES" in step S16, the game processing is terminated. When "NO" in step S16, the processing returns to step S2 and the above-described game processing is repeated.

With reference to FIG. 12, processing executed when it is determined in step S6 that a coordinate value is stored in the first coordinate value storage area 23 ("YES" in step S6) will be described. Referring to FIG. 12, it is determined whether or not the input coordinate value is different from the coordinate value stored in the first coordinate value storage area 23 (step S25). Namely, it is determined whether or not the same position is either kept pressed or double-tapped. When the input coordinate value is determined to be the same as the coordinate value stored in the first coordinate value storage area 23 ("NO" in step S25), the processing directly advances to step S13. When the input coordinate value is determined to be different from the coordinate value stored in the first coordinate value storage area 23 ("YES" in step S25), it is determined whether or not the input coordinate value is encompassed in the area of the block 51 indicated by the designated block ID stored in step S10 (hereinafter, such a block 51 will be referred to as a "designated block") (step S26). Namely, it is determined whether the same block 51 has been double-tapped. Specifically, it is determined whether or not the block ID of the block displayed in the area on the screen encompassing the input coordinate value (see FIG. 9) matches the designated block ID. When the input coordinate value is determined to be encompassed in the area of the designated block 51, i.e., when the designated block 51 has been double-tapped ("YES" in step S26), the input coordinate value is stored in the second coordinate value storage area 24 (step S27).

Next, based on the coordinate values stored in the first coordinate value storage area 23 and the second coordinate value storage area 24, the changing direction and the changing amount (distance between the coordinate values) are detected (step S28). Specifically, the coordinate values are compared as follows. Regarding the X-Y coordinate system of the LCD 12, the X coordinates are set as follows in the transverse direction of the LCD 12. The X coordinate at the left end of the LCD 12 is set as 0, and the X coordinate at the right end of the LCD 12 is set as maximum. The X coordinate increases as approaching the right end. With this premise, the X coordinate of the coordinate value stored in the first coordinate value storage area 23 (hereinafter, referred to as the "first coordinate value") is compared with the X coordinate of the coordinate value stored in the second coordinate value storage area 23 (hereinafter, referred to as the "second coordinate value"). When there is a relationship of the X coordinate of the first coordinate value<the X coordinate of the second coordinate value, the changing direction is determined as "rightward". When there is a relationship of the X coordinate of the first coordinate value>the X coordinate of the second coordinate value, the changing direction is determined as "leftward". The difference between the X coordinates is set as the changing amount. For example, it is assumed that where the coordinate value of the upper left corner of the LCD 12 is (0, 0), the first coordinate value is (10, 20) and the second coordinate value is (20, 20). In this case, the changing direction is "rightward" and the changing amount is "10". Since the blocks 51 are rotated only clockwise or counterclockwise in this game as described above, the above-described determination is made only on the X coordinates with no consideration of the Y coordinates.

After step S28, it is determined whether or not the double tap continuous frame number is 0 (step S29). Namely, it is determined whether the double tap operation (by which the stick 17 or the like once presses the touch panel 16, is taken off, and then presses the touch panel 16 again) has been performed or the drag operation (by which the finger or the stick 17 is moved while kept in contact with the touch panel 16) has been performed. When the double tap continuous frame number is determined to be 0 ("YES" in step S29), this means that the drag operation has been performed. Therefore, the designated block is moved based on the changing direction and the changing amount detected in step S28 (step S30). Namely, the designated block is moved based on the direction connecting at least two input coordinate values detected in succession and the amount obtained based on the at least two input coordinate values.

When the double tap continuous frame number is determined not to be 0 ("NO" in step S29), this means that the double tap operation has been performed. Therefore, processing of rotating the designated block is executed (step S31). FIG. 13 is a flowchart illustrating the rotation processing in step S31 in detail. Referring to FIG. 13, it is determined whether or not the changing direction is "rightward" (step S41). When the changing direction is determined to be "rightward" ("YES" in step S41), it is determined whether or not the changing amount is in the range of 1 through 10 (step S42). This is performed in order to vary the rotation angle in accordance with the changing amount. When the changing amount is determined to be in the range of 1 through 10 ("YES" in step S42), the designated block is rotated clockwise by 90 degrees (step S43). When the changing amount is determined to be outside the range of 1 through 10 (i.e., 11 or greater), the designated block is rotated clockwise by 180 degrees (step S44). Namely, when the position tapped the first time and the position tapped the second time are close to each other in the double tap operation, the designated block is rotated only by 90 degrees; whereas when the two positions are far from each other, the designated block is rotated by as much as 180 degrees.

When the changing direction is determined not to be "rightward" ("NO" in step S41), it is determined whether or not the changing direction is "leftward" (step S45). When the changing direction is determined to be "leftward" ("YES" in step S45), it is determined whether or not the changing amount is in the range of 1 through 10 as in step S42 (step S46). When the changing amount is determined to be in the range of 1 through 10 ("YES" in step S46), the designated block is rotated counterclockwise by 90 degrees (step S47). When the changing amount is determined to be outside the range of 1 through 10 (i.e., 11 or greater), the designated block is rotated counterclockwise by 180 degrees (step S48).

When the changing direction is determined not to be "leftward" ("NO" in step S45), the block rotation processing is terminated.

Next, processing of checking whether or not the designated block which has been rotated does not collide against another block is executed (step S49). Specifically, first, it is determined whether or not the post-rotation position of the designated block overlaps the position of another block even partially. When the post-rotation position is determined not to overlap the position of any other block, the block rotation processing is terminated. When the post-rotation position is determined to overlap the position of another block, the return flag is turned on. Then, the block rotation processing in step S31 is terminated.

Returning to FIG. 12, after steps S30 or S31, the first coordinate value storage area 23 and the second coordinate value storage area 24 are cleared (step S32). Namely, since the designated block has been moved or rotated, the information used for determinations on the double tap operation is cleared. Then, the processing advances to step S13 described above.

Next, processing executed when it is determined in step S26 that the input coordinate value is not encompassed in the area of the designated block 51 ("NO" in step S26) will be described. In this case, it is determined whether or not the input coordinate value is encompassed in the area of another block 51 (step S33). Specifically, the block table (see FIG. 9) is referred to, and it is determined whether or not the block ID of the area at the coordinate value corresponding to the input coordinate value is 0. When the block ID is determined to be 0 ("NO" in step S33), this means that no block exists in the area and the processing advances to step S32. When the block ID is determined not to be 0 ("YES" in step S33), this means that a block 51 different from the block 51 tapped the first time in the double tap operation has been tapped. Therefore, the processing advances to step S11 described above, and the newly tapped block is set as the designated block. Then, the subsequent processing is executed.

Returning to FIG. 10, processing executed when it is determined in step S2 that the return flag is on ("YES" in step S2) will be described. In this case, rotation cancellation display processing (step S17) is executed. By this processing, for example, when the designated block 51 overlaps another block 51 if rotated clockwise by 90 degrees (i.e., when the block 51 cannot be rotated fully by 90 degrees), processing of returning the designated block 51 to the pre-rotation position is executed. Specifically, an animation is displayed in which the designated block is rotated, and when colliding against another block 51, the designated block is rotated in the opposite direction. When the designated block 51 returns to the pre-rotation position, the return flag is turned off.

The game processing in this embodiment is executed as described so far.

As described above, in the first embodiment, the rotation direction is determined based on the change in the input coordinate value in the double tap operation. Therefore, the block 51 can be rotated with a simple and quick operation, and thus a game having a high degree of maneuverability can be provided. Since the drag operation is used to move the block 51, the operation to move the operation target object and the operation to rotate the operation target object can be separately performed. Therefore, the user can move the operation target object intuitively. Since the rotation angle of the block 51 is varied in accordance with the changing amount, the user can intuitively control the rotation amount and thus can maneuver the block 51 in a more complex manner with a simple procedure.

In the above embodiment, a block 51 is not rotated unless the position tapped the first time and the position tapped the second time in the double tap operation are in the same block 51. Alternatively, the block 51 may be set to be rotated even when the position tapped the second time is outside the block 51 encompassing the position tapped the first time. Namely, the processing in step S26 or S33 in FIG. 12 may be omitted. In this manner, the player can perform the rotation operation more easily. In the above embodiment, a block 51 is not rotated when the position tapped the first time and the position tapped the second time in the double tap operation are the same ("NO" in step S25 in FIG. 12) or when the X coordinate of the position tapped the first time and the X coordinate of the position tapped the second time are the same ("NO" in step S45 in FIG. 13). Alternatively, the block 51 may be rotated in a predetermined direction (e.g., clockwise) in such cases.

In the above embodiment, the rotating amount is determined in units of 90 degrees. Alternatively, the rotating amount may be determined in units of a smaller degree.

The moving operation may be set such that, even if no block is designated before the drag operation, if a block is designated in the middle of the drag operation, the block is moved. For example, first, a position outside any block is pressed with the stick 17. The stick 17 is moved so as to cross a block while kept in contact with the touch panel 16. At this point, the block that the stick 17 is crossing may be moved.

Modified Embodiment

In the above embodiment, Y coordinates of input coordinate values are not considered for determining the rotation direction of the block. Alternatively, the Y coordinates may be considered for the rotation processing. This is especially effective for, for example, a game represented by a three-dimensional image. Hereinafter, the rotation processing executed in consideration of the Y coordinates will be described.

Figure 14:
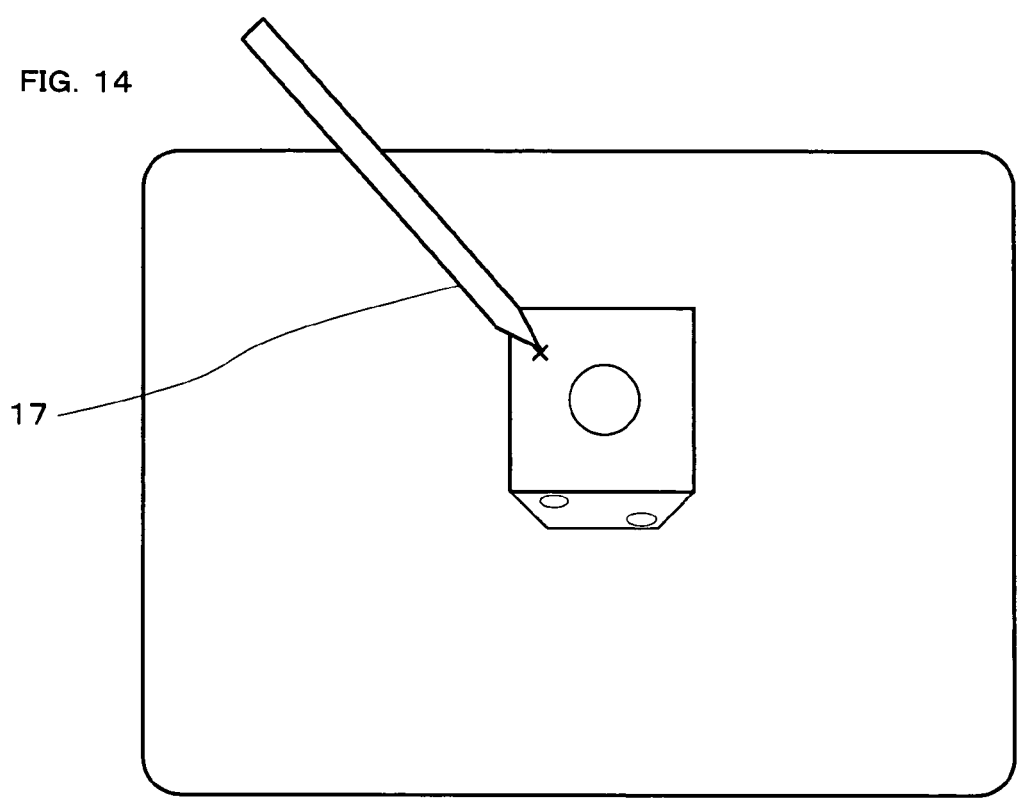
FIG. 14 illustrates a rotation operation.
Figure 15:
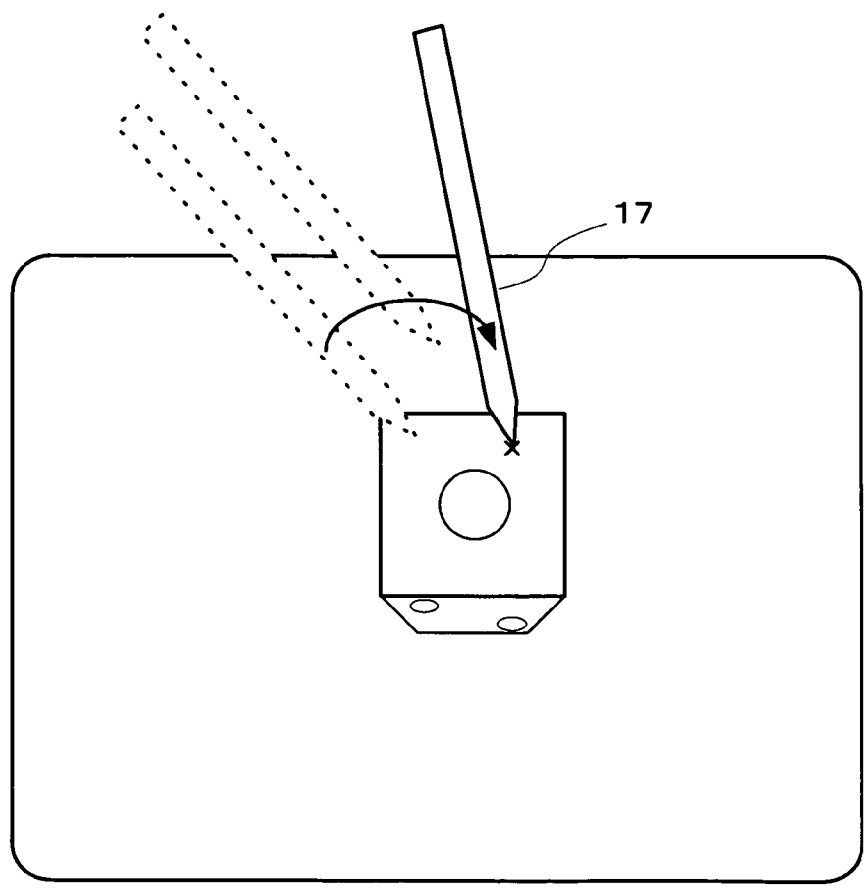
FIG. 15 illustrates a rotation operation.
Figure 16:
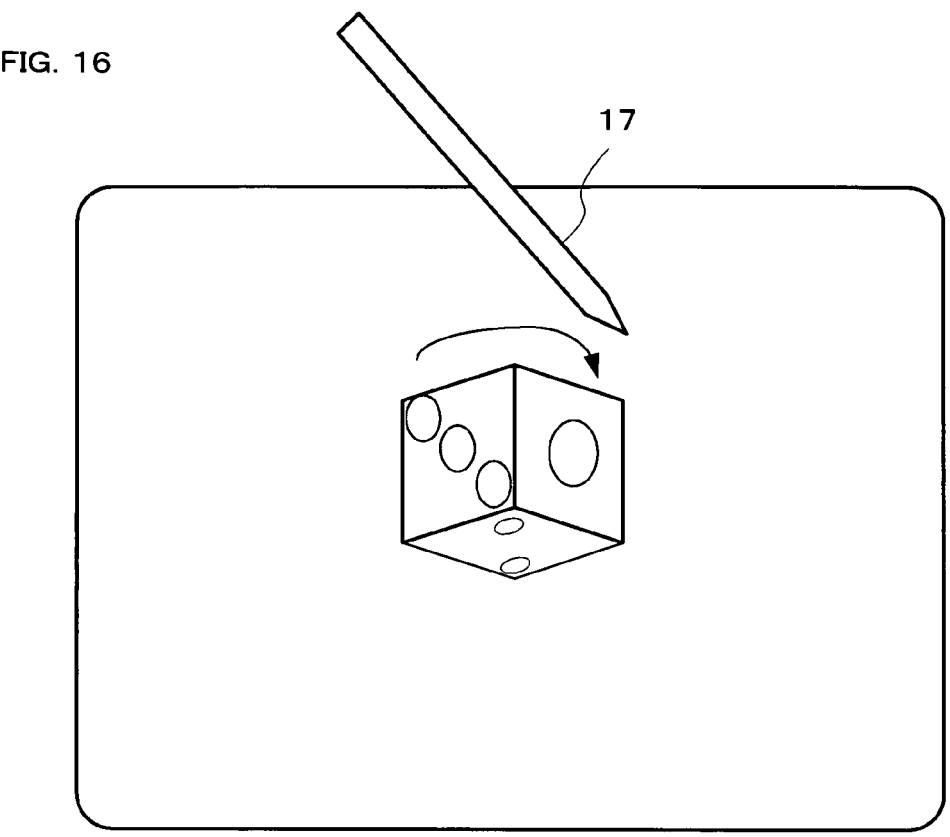
FIG. 16 illustrates a rotation operation.
Figure 17:
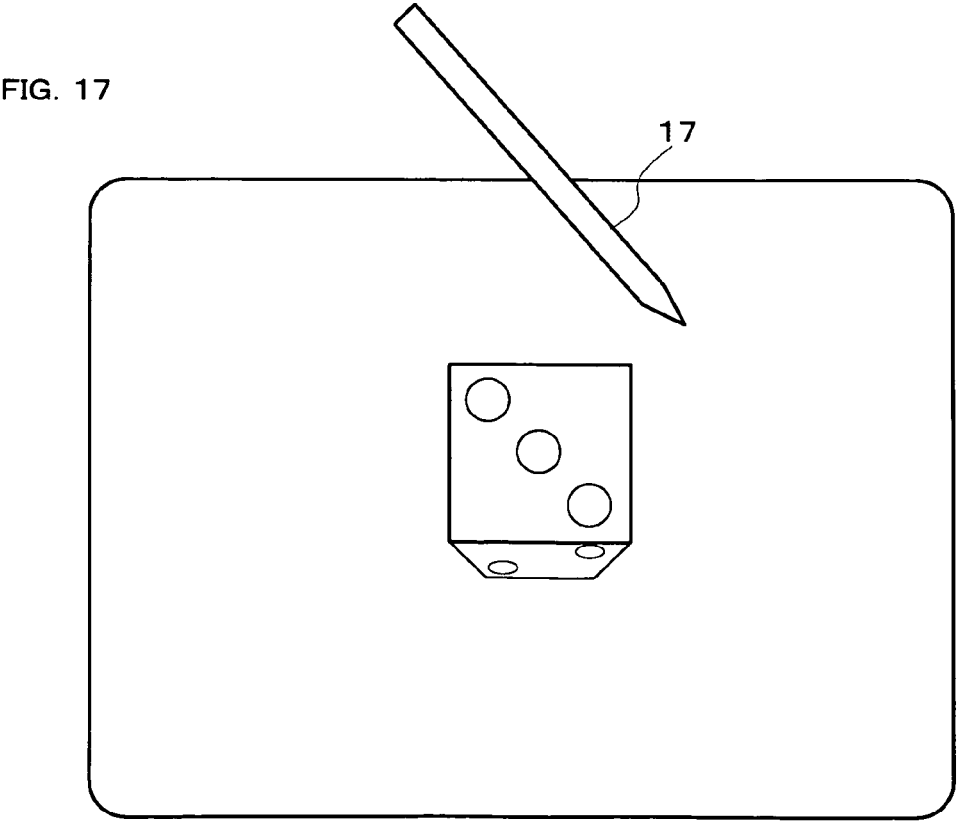
FIG. 17 illustrates a rotation operation.
Figure 18:
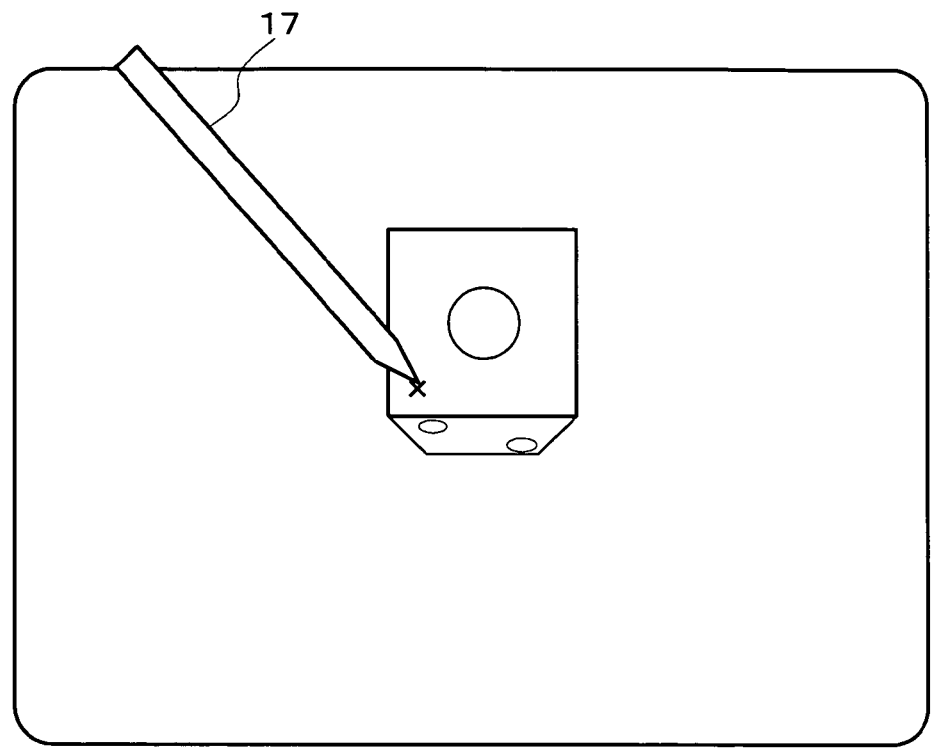
FIG. 18 illustrates a rotation operation.
Figure 19:
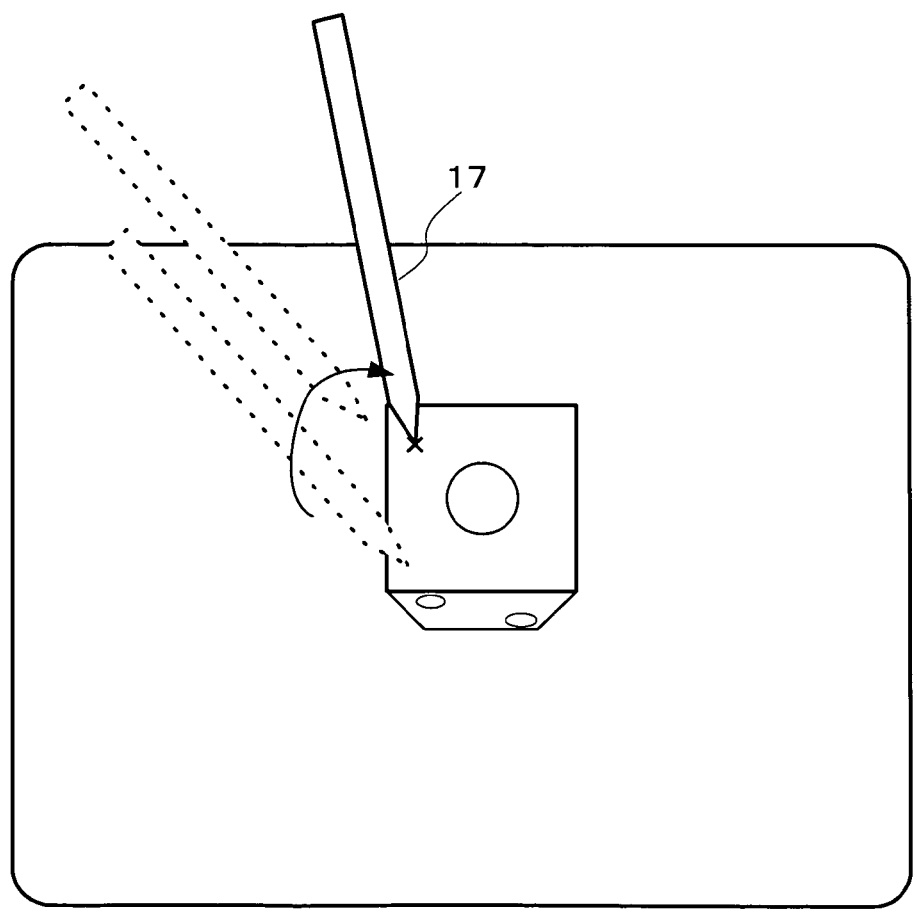
FIG. 19 illustrates a rotation operation.
Figure 20:
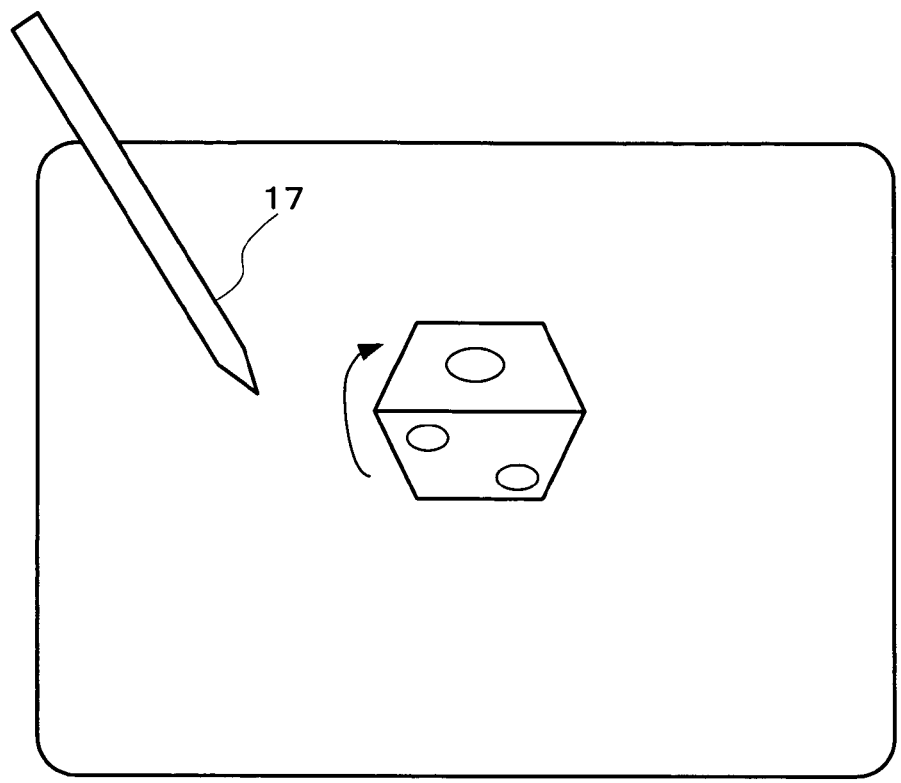
FIG. 20 illustrates a rotation operation.
Figure 21:
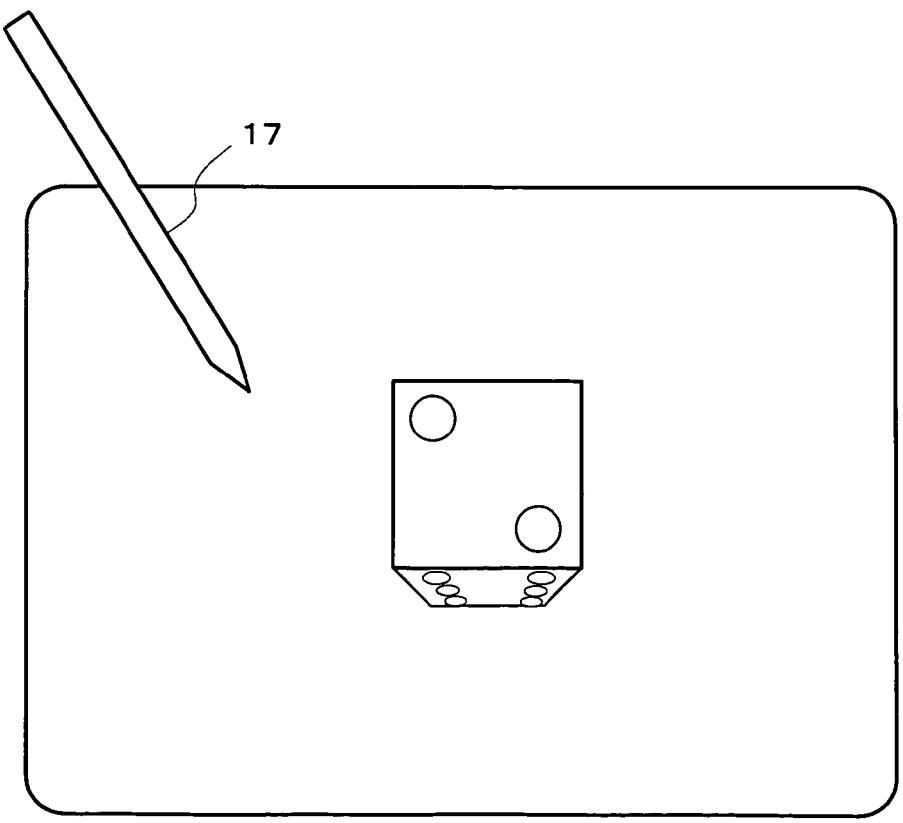
FIG. 21 illustrates a rotation operation.

FIG. 14 through FIG. 21 schematically show an overview of an operation of rotating a dice (an operation target object) displayed in a three-dimensional image. For example, for rotating the dice rightward, the following operation is performed. First, as shown in FIG. 14, a front face of the dice is pressed with the stick 17. Then, the stick 17 is taken off from the touch panel 16, and a position of the front face of the dice which is right to the first position pressed is pressed with the stick 17 within a predetermined time duration (FIG. 15). By this operation, the dice is rotated rightward (FIG. 16 and FIG. 17). Similarly, for rotating the dice upward, the following operation is performed. First, as shown in FIG. 18, the front face of the dice is pressed with the stick 17. Then, the stick 17 is taken off from the touch panel 16, and a position of the front face of the dice which is upper to the first position pressed is pressed with the stick 17 within a predetermined time duration (FIG. 19). By this operation, the dice is rotated upward (FIG. 20 and FIG. 21).

Next, the rotation processing described above will be described in detail. The basic flow of processing is substantially the same as that described above with reference to FIG. 10 through FIG. 12 (except that the dice is used instead of the block 51). The block rotation processing described above with reference to FIG. 13 is replaced with object rotation processing described below with reference to FIG. 22.

FIG. 22 is a flowchart illustrating the object rotation processing in detail, which is executed in consideration of the Y coordinates in addition to the X coordinates. Before the processing in FIG. 22 is executed, in step S26 (FIG. 12), the direction of "upward" or "downward" is detected by comparing the Y coordinates of the pressed positions, in addition to the direction of "rightward" or "leftward". For example, regarding the X-Y coordinate system of the LCD 12, the Y coordinates are set as follows in the vertical direction of the LCD 12. The Y coordinate at the upper end of the LCD 12 is set as 0, and the Y coordinate at the lower end of the LCD 12 is set as maximum. The Y coordinate increases as approaching the lower end. With this premise, when there is a relationship of the Y coordinate of the first coordinate value<the Y coordinate of the second coordinate value, the changing direction is determined as "downward". When there is a relationship of the Y coordinate of the first coordinate value>the Y coordinate of the second coordinate value, the changing direction is determined as "upward". When both the X coordinate and the Y coordinate of the two coordinate values vary, either the X coordinate or the Y coordinate which varies by a larger amount is used. For example, when the first coordinate value is (10, 10) and the second coordinate value is (20, 15), the changing direction is both "rightward" and "downward". The changing amount in the X coordinate is 10, and the changing amount in the Y coordinate is 5. Therefore, the changing direction is determined to be "rightward". Alternatively, when the changing direction is both "rightward" and "downward", both of the directions may be determined to be the changing direction.

After the changing direction is detected as described above, the processing shown in FIG. 22 is executed. First, it is determined whether or not the changing direction is "rightward" (step S51). When the changing direction is determined to be "rightward" ("YES" in step S51), the dice (an operation target object) is rotated rightward by 90 degrees (step S52). When the changing direction is determined not to be "rightward" ("NO" in step S51), it is determined whether or not the changing direction is "leftward" (step S53). When the changing direction is determined to be "leftward" ("YES" in step S53), the dice is rotated leftward by 90 degrees (step S54). When the changing direction is determined not to be "leftward" ("NO" in step S53), it is determined whether or not the changing direction is "upward" (step S55). When the changing direction is determined to be "upward" ("YES" in step S55), the dice is rotated upward by 90 degrees (step S56). When the changing direction is determined not to be "upward" ("NO" in step S55), it is determined whether or not the changing direction is "downward" (step S57). When the changing direction is determined to be "downward" ("YES" in step S57), the dice is rotated downward by 90 degrees (step S58). When the changing direction is determined not to be "downward" ("NO" in step S57), the object rotation processing is terminated.

By executing the rotation processing in consideration of the Y coordinates as well as the X coordinates, various changes can be made on the operation target object. For example, a variety of manners of playing can be provided in a game using a three-dimensional space.

In the above embodiments, the rotation direction is determined so as to match the moving direction of the double tap operation; for example, when the tapped positions are moved rightward in the double tap operation, the object is rotated clockwise or rightward. Alternatively, the moving direction of the double tap operation may be different from the rotation direction of the object. For example, the rotation direction may be set to be upward when the moving direction of the double tap operation is rightward, or the rotation direction may be set to be clockwise or rightward when the moving direction of the double tap operation is upward. The moving direction of the double tap operation does not need to be matched to the rotation direction of the object. In this way, even a simple operation of double tap can be used to rotate the object in various directions in accordance with the moving direction of the tapped positions. Thus, a wider variety of manners of playing can be provided in, for example, a game using the rotation of an object. In the above embodiments, when at least one of the position tapped the first time and the position tapped the second time is encompassed in the area in which an operation target object is displayed, the operation target object is rotated. The present invention is not limited to this. For example, in the case where there is only one operation target object, the operation target object may be rotated when neither the position tapped the first time nor the position tapped the second time is encompassed in the area in which the operation target object is displayed. Still alternatively, an operation area may be provided in an arbitrary area of the LCD 12 separately from the game screen as shown in FIG. 3. In this case, the operation target object may be rotated by performing the double tap operation in the operation area.

In the above embodiments, the touch panel 16 is used as a pointing device for designating a position on the display screen. Other pointing devices may be used. A pointing device is an input device for designating an input position or an input coordinate value on the display screen. The present invention can be carried out by, for example, using a mouse, a track pad or a track ball as an input device and also using information on the coordinate system of the screen which is calculated from the value output from the input device. In the case where a mouse or the like is used as the pointing device, a touch state and a non-touch state may be associated with an ON state and an OFF state of the click button thereof, and processing of calculating a coordinate value based on the value output from the mouse or the like may be executed by a game apparatus or the like.

While the invention has been described in detail, the foregoing description is in all aspects illustrative and not restrictive. It is understood that numerous other modifications and variations can be devised without departing from the scope of the invention.

What is claimed is:

1. A storage medium having stored thereon an image processing program for causing a computer of an image processing apparatus, including a display device for displaying, on a screen, an operation target object in a virtual space and a pointing device for designating a position on the screen, to execute:
   an input coordinate value detection step of detecting an input coordinate value indicating a position on the screen designated by the pointing device every predetermined time unit;
   a direction calculation step of, where a first input coordinate value has been detected in the input coordinate value detection step, determining whether or not there is a second input coordinate value which was detected discretely from, and before, the first input coordinate value, and when there is the second input coordinate value, calculating a changing direction based on the first input coordinate value and the second input coordinate value; and
   a rotation step of rotating the operation target object in a rotation direction in accordance with the changing direction calculated in the direction calculation step.

2. A storage medium according to claim 1, wherein in the rotation step, when either one of the first input coordinate value and the second input coordinate value is encompassed in an area on the screen which is occupied by an operation target object, the operation target object occupying the area encompassing the either one of the first input coordinate value and the second input coordinate value is rotated.

3. A storage medium according to claim 1, wherein:
   the image processing program causes the computer to further execute a time determination step of determining whether or not the first input coordinate value was detected within a predetermined time duration after the second input coordinate value was detected; and
   in the rotation step, only when it is determined in the time determination step that the first input coordinate value was detected within the predetermined time duration after the second input coordinate value was detected, the operation target object is rotated.

4. A storage medium according to claim 1, wherein:
   the image processing program causes the computer to further execute a distance calculation step of calculating a distance from the second input coordinate value to the first input coordinate value; and
   in the rotation step, an angle by which the operation target object is rotated is varied in accordance with the distance calculated in the distance calculation step.

5. A storage medium according to claim 1, wherein the image processing program causes the computer to further execute:
   an overlap check step of determining whether or not a position in which the operation target object rotated in the rotation step is displayed overlaps a position in which another object is displayed on the screen; and
   a rotation cancellation step of, when it is determined in the overlap check step that the positions overlap, displaying, on the screen, a motion of the operation target object rotating and then a motion of the operation target object returning to the position before the rotation.

6. A storage medium according to claim 1, wherein the image processing program causes the computer to further execute:
   a continuous direction calculation step of calculating a changing direction based on at least two input coordinate values detected in succession in the input coordinate value detection step; and
   a moving step of moving the operation target object in a moving direction in accordance with the changing direction calculated in the continuous direction calculation step.

7. A storage medium according to claim 6, wherein:
   the image processing program causes the computer to further execute a designation determination step of determining whether or not either one of the at least two input coordinate values detected in succession in the input coordinate value detection step is encompassed in an area of the screen occupied by an operation target object; and
   in the moving step, when it is determined in the designation determination step that either one of the at least two input coordinate values is encompassed in the area, the operation target object occupying the area encompassing the either one of the at least two input coordinate values is rotated.

8. A storage medium according to claim 7, wherein:
   in the designation determination step, it is determined whether or not the input coordinate value first detected among the at least two input coordinate values detected in succession is encompassed in the area of the screen occupied by an operation target object; and
   in the moving step, the operation target object occupying the area encompassing the input coordinate value first detected is moved.

9. A storage medium having stored thereon a game program for causing a computer of a game apparatus, including a display device for displaying, on a screen, an operation target object in a virtual space and a pointing device for designating a position on the screen, to execute:
- an input coordinate value detection step of detecting an input coordinate value indicating a position on the screen designated by the pointing device every predetermined time unit;
- a determination step of, where a first input coordinate value has been detected in the input coordinate value detection step, determining whether or not there is a second input coordinate value which was detected discretely from, and before, the first input coordinate value, and of determining whether or not there are at least two input coordinate values detected in succession;
- a direction calculation step of, when it is determined in the determination step that there is the second input coordinate value, calculating a changing direction based on the first input coordinate value and the second input coordinate value;
- a rotation step of rotating the operation target object in a rotation direction in accordance with the changing direction calculated in the direction calculation step;
- a continuous direction calculation step of, when it is determined in the determination step that there are the at least two input coordinate values detected in succession, calculating a direction connecting the at least two input coordinate values; and
- a moving step of moving the operation target object in a moving direction in accordance with the direction calculated in the continuous direction calculation step.

10. An image processing apparatus including a display device for displaying, on a screen, an operation target object in a virtual space and a pointing device for designating a position on the screen, the image processing apparatus comprising:
- an input coordinate value detection section for detecting an input coordinate value indicating a position on the screen designated by the pointing device every predetermined time unit;
- a direction calculation section for, where a first input coordinate value has been detected by the input coordinate value detection section, determining whether or not there is a second input coordinate value which was detected discretely from, and before, the first input coordinate value, and when there is the second input coordinate value, calculating a changing direction based on the first input coordinate value and the second input coordinate value; and
- a rotation section for rotating the operation target object in a rotation direction in accordance with the changing direction calculated by the direction calculation section.

11. A game apparatus including a display device for displaying, on a screen, an operation target object in a virtual space and a pointing device for designating a position on the screen, the game apparatus comprising:
- an input coordinate value detection section for detecting an input coordinate value indicating a position on the screen designated by the pointing device every predetermined time unit;
- a determination section for, where a first input coordinate value has been detected by the input coordinate value detection section, determining whether or not there is a second input coordinate value which was detected discretely from, and before, the first input coordinate value, and for determining whether or not there are at least two input coordinate values detected in succession;
- a direction calculation section for, when it is determined by the determination section that there is the second input coordinate value, calculating a changing direction based on the first input coordinate value and the second input coordinate value;
- a rotation section for rotating the operation target object in a rotation direction in accordance with the changing direction calculated by the direction calculation section;
- a continuous direction calculation section for, when it is determined by the determination section that there are the at least two input coordinate values detected in succession, calculating a direction connecting the at least two input coordinate values; and
- a moving section for moving the operation target object in a moving direction in accordance with the direction calculated by the continuous direction calculation section.

* * * * *